(12) United States Patent
Kushler et al.

(10) Patent No.: US 9,244,611 B2
(45) Date of Patent: Jan. 26, 2016

(54) PERFORMING ACTIONS ON A COMPUTING DEVICE USING A CONTEXTUAL KEYBOARD

(75) Inventors: Clifford A. Kushler, Lynnwood, WA (US); Jane Manning, Palo Alto, CA (US); Mike McSherry, Seattle, WA (US); Aaron Sheedy, Seattle, WA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 170 days.

(21) Appl. No.: 13/301,724

(22) Filed: Nov. 21, 2011

(65) Prior Publication Data

US 2012/0127082 A1    May 24, 2012

Related U.S. Application Data

(60) Provisional application No. 61/415,828, filed on Nov. 20, 2010.

(51) Int. Cl.
   *G09G 5/00* (2006.01)
   *G06F 3/041* (2006.01)
   *G06F 3/0488* (2013.01)

(52) U.S. Cl.
   CPC ................... *G06F 3/04886* (2013.01)

(58) Field of Classification Search
   CPC .................. G06F 17/27; G09G 5/00
   See application file for complete search history.

(56) References Cited

U.S. PATENT DOCUMENTS

| | | | |
|---|---|---|---|
| 5,781,663 A | 7/1998 | Sakaguchi et al. | |
| 6,792,408 B2 | 9/2004 | Sauber | |
| 6,999,955 B1 * | 2/2006 | Horvitz | 706/45 |
| 7,098,896 B2 | 8/2006 | Kushler et al. | |
| 7,250,938 B2 | 7/2007 | Kirkland et al. | |
| 7,251,367 B2 | 7/2007 | Zhai | |
| 7,382,358 B2 | 6/2008 | Kushler et al. | |
| 7,453,439 B1 | 11/2008 | Kushler et al. | |
| 7,480,619 B1 * | 1/2009 | Scott | 704/275 |
| 7,542,029 B2 | 6/2009 | Kushler | |
| 7,890,396 B2 | 2/2011 | Weinstein | |
| 8,479,118 B2 | 7/2013 | Lyndersay et al. | |
| 8,626,823 B2 | 1/2014 | Kumar | |
| 8,726,195 B2 | 5/2014 | Bill | |
| 2002/0188454 A1 * | 12/2002 | Sauber | 704/275 |
| 2003/0023952 A1 | 1/2003 | Harmon | |
| 2005/0146508 A1 * | 7/2005 | Kirkland et al. | 345/169 |
| 2005/0240576 A1 * | 10/2005 | Piscitello et al. | 707/3 |

(Continued)

OTHER PUBLICATIONS

International Search Report for International Application No. PCT/US2011/61536, Date of Mailing: Jul. 25, 2012, 12 pages.

(Continued)

*Primary Examiner* — Ilana Spar
*Assistant Examiner* — Paras D Karki
(74) *Attorney, Agent, or Firm* — Perkins Coie LLP

(57) ABSTRACT

A system and method for performing actions via a keyboard application of a computing device is described. In some examples, a contextual keyboard facilitates the entry of text and the performance of actions across applications supported by a device. For example, the contextual keyboard may receive a word macro and/or a gesture, and determine that the received word macro and/or gesture is a command to perform one or more actions. Example actions to be performed include searching for information, storing information, posting information, sending information, enhancing information, and so on.

20 Claims, 21 Drawing Sheets

(56) References Cited

U.S. PATENT DOCUMENTS

| | | | |
|---|---|---|---|
| 2006/0024126 A1 | 2/2006 | Johansson et al. | |
| 2006/0253793 A1 | 11/2006 | Zhai et al. | |
| 2007/0038543 A1* | 2/2007 | Weinstein | 705/36 R |
| 2007/0130117 A1 | 6/2007 | Lapstun et al. | |
| 2008/0059570 A1* | 3/2008 | Bill | 709/203 |
| 2008/0174570 A1 | 7/2008 | Jobs et al. | |
| 2008/0316183 A1 | 12/2008 | Westerman et al. | |
| 2009/0125511 A1 | 5/2009 | Kumar | |
| 2009/0150826 A1 | 6/2009 | Lyndersay et al. | |
| 2010/0073329 A1 | 3/2010 | Raman et al. | |
| 2010/0185949 A1* | 7/2010 | Jaeger | 715/730 |
| 2010/0235726 A1* | 9/2010 | Ording et al. | 715/234 |
| 2010/0245261 A1 | 9/2010 | Karlsson | |
| 2012/0127080 A1 | 5/2012 | Kushler et al. | |
| 2012/0127083 A1 | 5/2012 | Kushler et al. | |

OTHER PUBLICATIONS

International Search Report for International Application No. PCT/US2011/61530, Date of Mailing: Jul. 30, 2012, 3 pages.
International Search Report for International Application No. PCT/US2011/61730, Date of Mailing: Jul. 30, 2012, 3 pages.

* cited by examiner

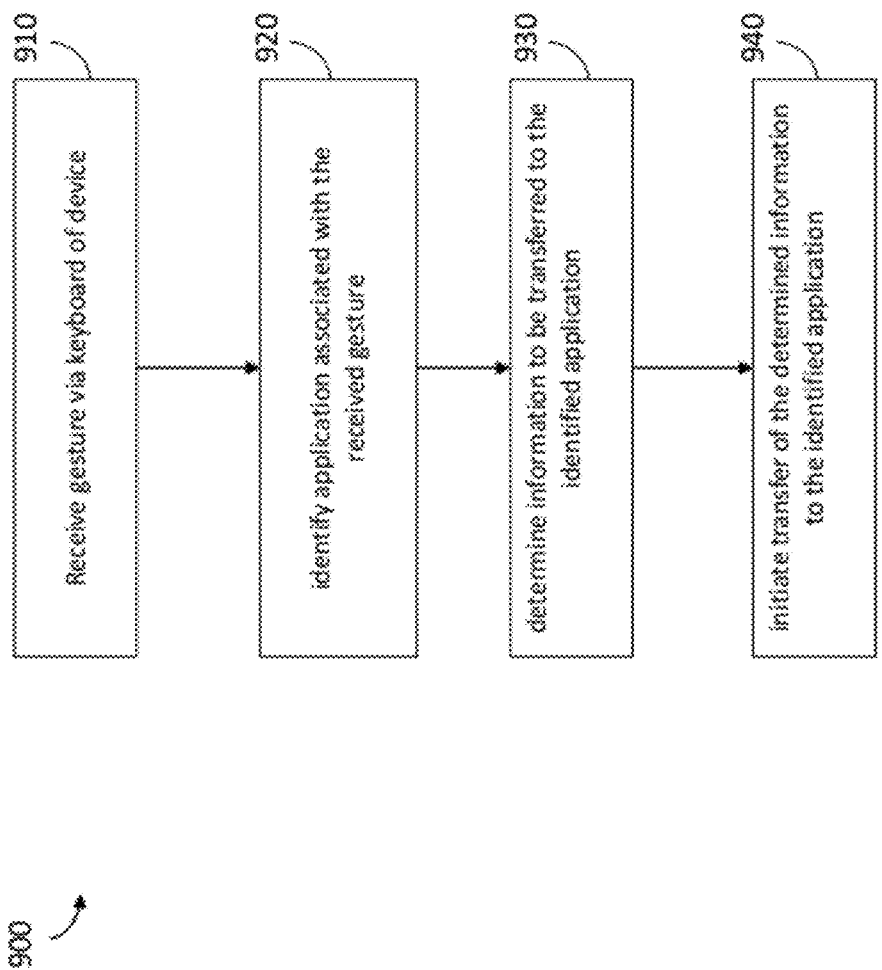

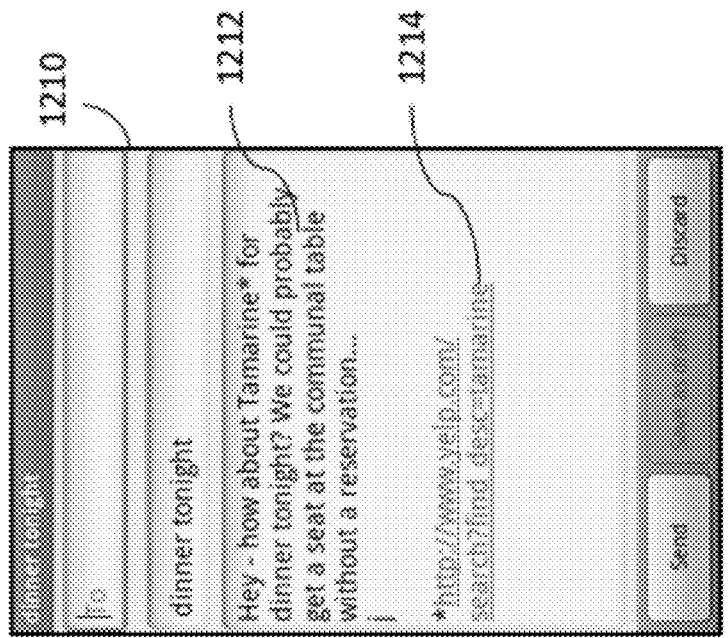
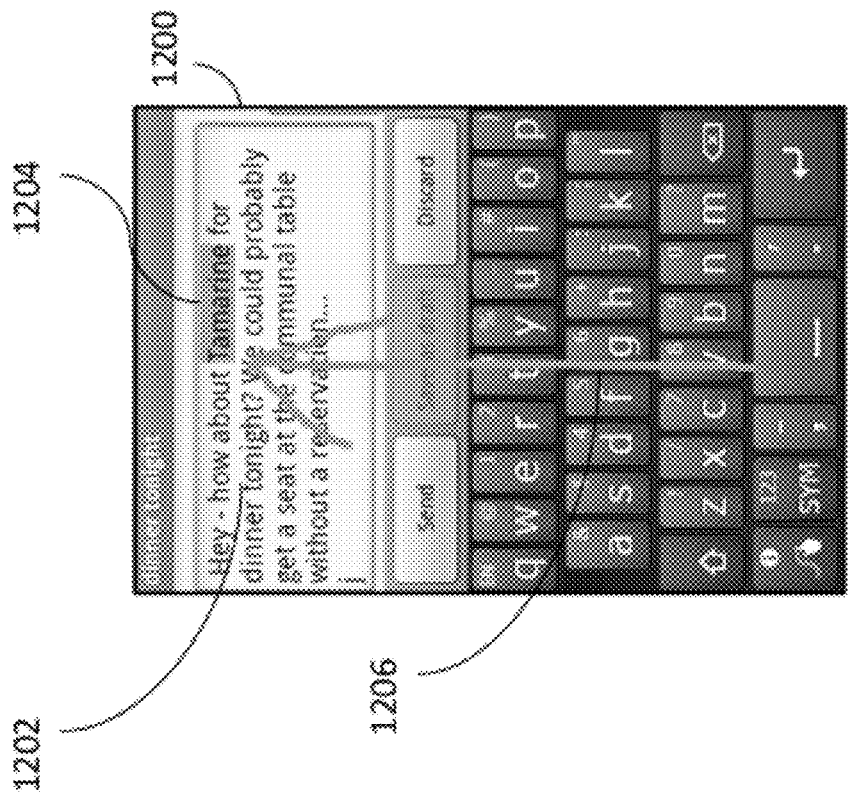
FIG. 12B
FIG. 12A

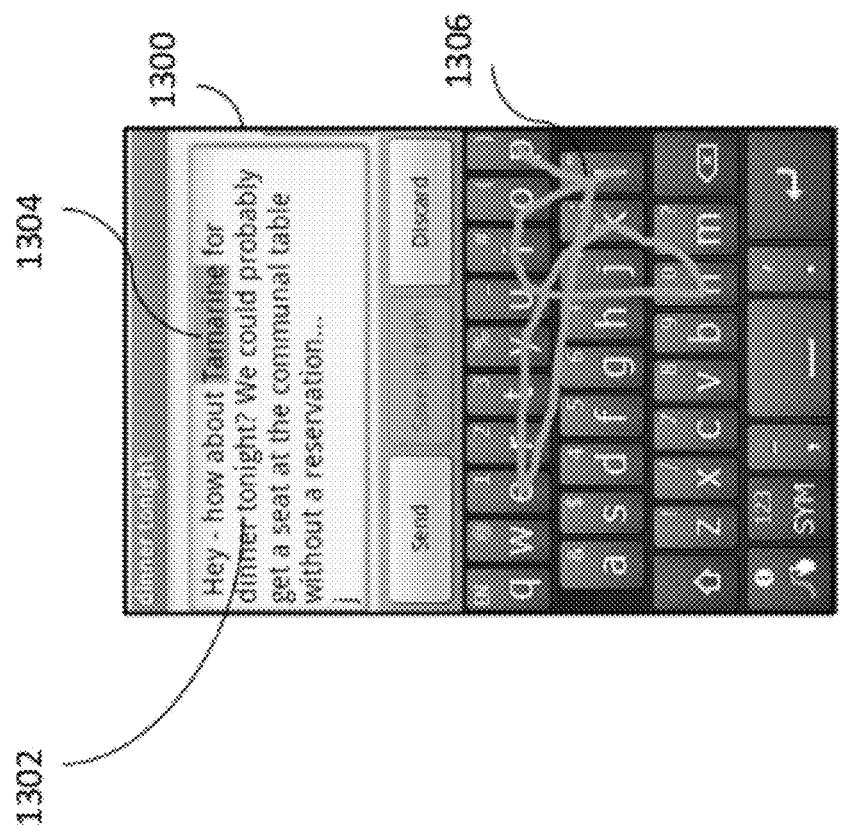

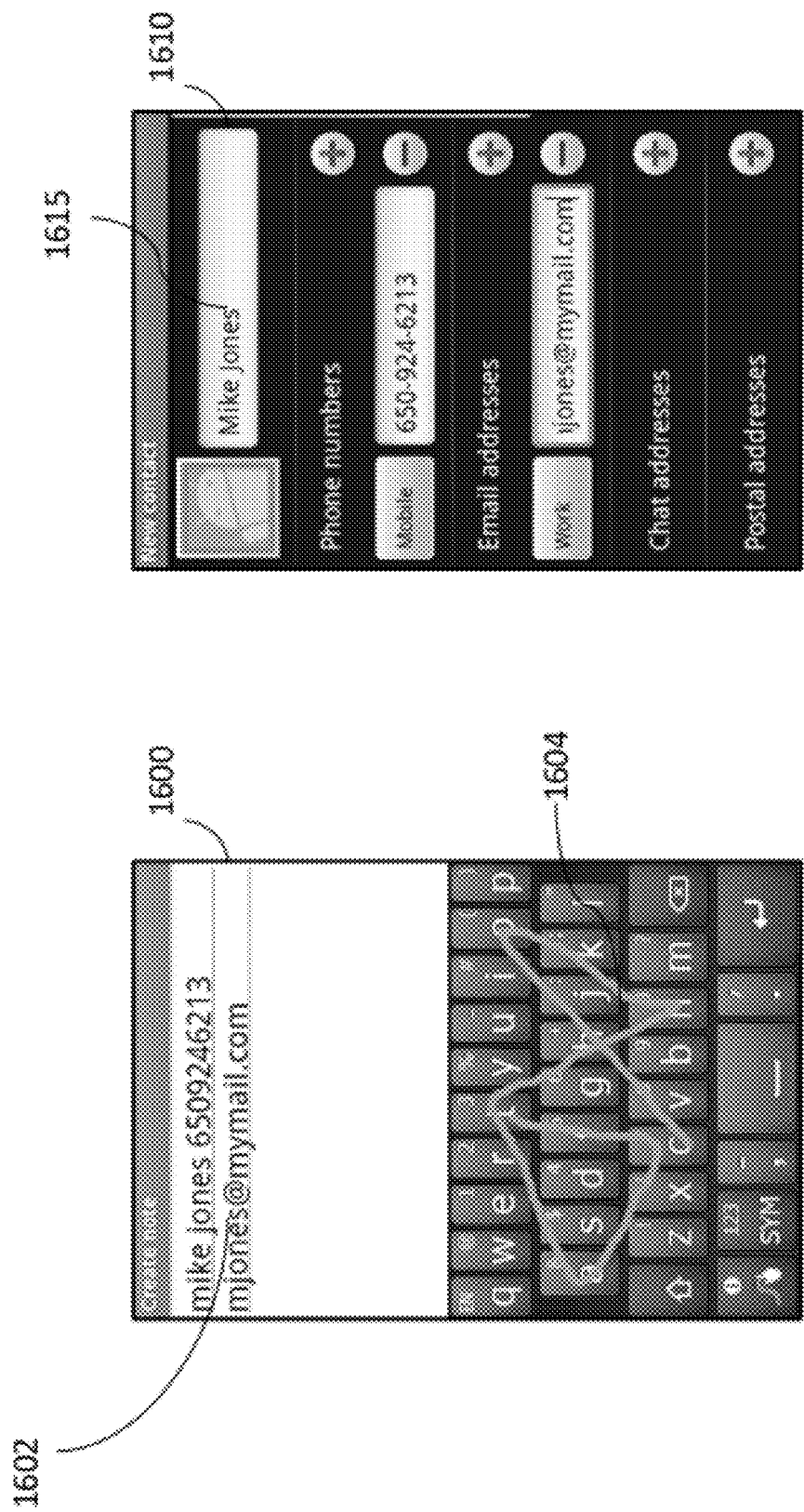

PERFORMING ACTIONS ON A COMPUTING DEVICE USING A CONTEXTUAL KEYBOARD

PRIORITY CLAIM

This application claims the benefit of U.S. Provisional Application Ser. No. 61/415,828 filed Nov. 20, 2010, the contents of which are hereby incorporated by reference.

BACKGROUND OF THE INVENTION

The origin of the modern keyboard as the primary method for inputting text from a human to a machine dates back to early typewriters in the 19th century. As computers were developed, it was a natural evolution to adapt the typewriter keyboard for use as the primary method for inputting text. For a skilled typist, the keyboard has remained the fastest way possible to input text into a computer or other data processing device.

With ongoing efforts to make computers smaller and more portable, the physical keyboard has become one of the most significant limiting factors in just how small a computing device can become: the physical size of the human finger is not something computer designers can change. As a result, computing devices for certain portable applications, such as mobile devices and tablet computers, have been designed without a physical keyboard, and instead use a touch-screen or virtual keyboard as a primary interface between a device and a human user.

Despite being implemented via a touch-screen, a virtual keyboard is often utilized merely as a mechanism in which to receive text input from a user. That is, although many innovations have delivered keyboards that are useful for modern devices, a typical virtual keyboard still functions like its predecessors, by only functioning to receive text entry from a user. This is similar to what a physical keyboard or early typewriters enable a user to do on a device, receive text input from a user.

Therefore, the need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

Preferred and alternative examples of the present invention are described in detail below with reference to the following drawings:

FIG. 9 is a flow diagram illustrating a routine for transmitting information to a target application in response to a gesture received by a keyboard application.

FIGS. 12A-12B are screen shots illustrating steps performed when inserting a link or other information into an application.

FIGS. 13A-13B are screen shots illustrating steps performed when inserting a link or other information into an application.

FIGS. 16A-16B are screen shots illustrating steps performed when storing information in a database.

DETAILED DESCRIPTION OF THE PREFERRED EMBODIMENT

Overview

A system and method for performing actions via a keyboard application of a computing device, such a mobile device or tablet device, is described. In some examples, the system receives input via a keyboard displayed on a touch-screen or other displayed virtual keyboard presented by a device, determines the received input is associated with an action to perform, and performs and/or initiates performance of the action.

The system will now be described with respect to various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

It is intended that the terminology used in the description presented below be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

Figure 1:
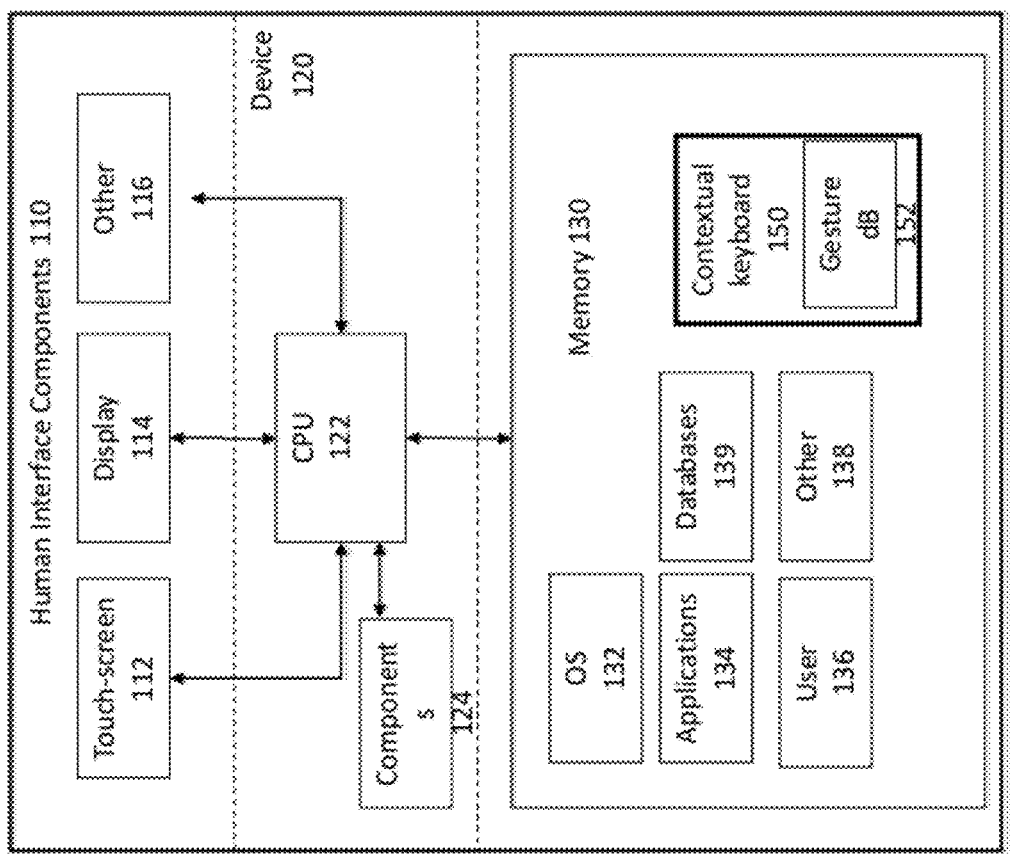
FIG. 1 is a block diagram illustrating components of a mobile device or other suitable computing device.

FIG. 1 illustrates a block diagram of a computing device 100 on which a keyboard application capable of performing actions, such as a "contextual keyboard," can be supported. The computing device 100 may be a mobile device, smartphone, tablet computer, net-book, mobile GPS navigation device, remote control, fixed telephone or communications console or apparatus, surface or tabletop computer, overhead image projector, desktop computer, e-reader, ATM machine, vending machine, or any other device having a keyboard, such as a virtual or touch-screen based keyboard, presented by a user interface of the device. The computing device 100 includes various hardware and/or software components configured to perform actions based on input received by a keyboard of the computing device 100. For example, the computing device 100 includes various human interface components 110, device components 120, and memory 130.

The computing device 100 includes a touch-screen 112 or other input component that provides input to a processor 122, such as input notifying the processor 122 of contact events when the touch-screen is touched. The touch-screen may include or communicate with a hardware controller, such as a touch-screen driver, that interprets raw signals received from the touch-screen and transmits information associated with the contact event (e.g., indication of a button or key press, X-Y coordinates of a point of contact (such as from a finger or stylus touch on a touch screen, touch pad, or graphics tablet), a gesture, a swipe path, a request by a user to press a physical or virtual key, the current position of a pointing input device, an area of contact, pressure, duration, and so on, to the processor 122. For example, the hardware controller may transmit information associated with a variety of pointing devices, including a mouse, a trackball, a joystick or analog stick, a pointing stick or nipple mouse, a roller mouse, a foot mouse, a palm mouse, a light pen, a light gun, a positional gun, a laser pointer, a gyroscope or gyroscopic mouse, an accelerometer, an eye tracking device, a video tracking device, a stylus, and so on. The processor 122 communicates with a hardware controller or driver associated with a display 114 to display information (e.g., letters of contacted keys on a displayed keyboard) associated with detected contact events. The display 114 may be integrated into computing device 100, may be part of touch-screen 112, or may be a stand-alone device. Example displays 114 include a touch-screen display, a flat panel display, a cathode ray tube, an electronic ink display, a head-mounted display, a liquid crystal display, a light-emitting diode display, a plasma panel display, an electro-luminescent display, a vacuum fluorescent display, a digital projector, a laser projector, a heads-up display, and so on. The device 114 may include other interface components 116, such a speaker that provides appropriate auditory signals to assist a user in navigating a displayed keyboard or other displayed component.

The computing device 100 may include various device components 124, such as sensors (e.g., GPS or other location determination sensors, motion sensors, gyroscopes, light sensors, and so on), removable storage devices (e.g., SIM cards), cameras and other video capture devices, microphones and other audio capture devices, communication devices (e.g., Bluetooth devices, radios, antennas), and so on.

The processor 122 may communicate with data or applications stored in memory 130 of the device 100, which may include a combination of temporary and/or permanent storage, and both read-only and writable memory (random access memory or RAM), read-only memory (ROM), writable non-volatile memory such as FLASH memory, hard drives, floppy disks, SIM-based components, and so on. The memory component includes various program components or modules, such as an operating system 132, and various applications 134, such as applications downloaded to the device 100. For example, the memory 130 may store applications native to the device that perpetually operate on the device (e.g., a keyboard application that provides a virtual keyboard, a text messaging application, and so on) as well as applications that are downloaded by a user and launched by the device (e.g., applications associated with social networking sites, games, and so on).

For example, the memory 130 may store a keyboard application, such as a contextual keyboard 150. The contextual keyboard 150, which may include a gesture database 152, provides, in some examples, greater functionality over standard keyboard applications, such as functionality that enables the keyboard to perform actions, provide information to other applications, and so on. Further details regarding the contextual keyboard 150 and its functionality will be described herein.

The memory component 150 also includes various data storage components, such a user data database 136, or other databases 139 that provide and/or store information for applications executed by the device 100. For example, the user database 136 may store information associated with a user of the device 100, such as contact information, subscriber information, biographical information, use information, trend information, preference information, and so on.

In general, the device 100 may store or contain any and all components, modules, or data files required or used by the device 100 and/or the contextual keyboard 150 when performing actions, among other things.

FIG. 1 and the discussion herein provide a brief, general description of a suitable computing environment in which the contextual keyboard can be implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, handheld devices (including tablet computers and/or personal digital assistants (PDAs)), all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

The Contextual Keyboard

As described herein, in some examples, a contextual keyboard, or contextual keyboard application, enables a user of a mobile device to perform actions via a keyboard presented to the user via a touch-screen or other user interface of a computing device. That is, in some examples, the contextual keyboard is a keyboard application of a computing device that recognizes received text or other input (e.g., gestures) as processing commands, and detects objects in the application environment of the computing device upon which those commands are performed. Thus, the contextual keyboard may perform dual functions, a first function of facilitating the entry of text from a user, and a second function of performing actions based on commands (e.g., word macros or gestures) input via the keyboard.

The keyboard is a useful place to add functionality. Typically, the keyboard is a layer of software that is often or always accessible when using a computing device and its various applications. Therefore, adding other functionality within or associated with a keyboard would provide many benefits, such as easy or simple navigation between applications on a device, enhanced user interface capabilities, and other benefits. For example, the keyboard may act as an information exchange medium, enabling users to access data residing on their device or in locations to which their device communicates, and exchange that information with applications or other programs running on the device. Various components of the contextual keyboard that may perform such techniques will now be discussed.

Figure 2:
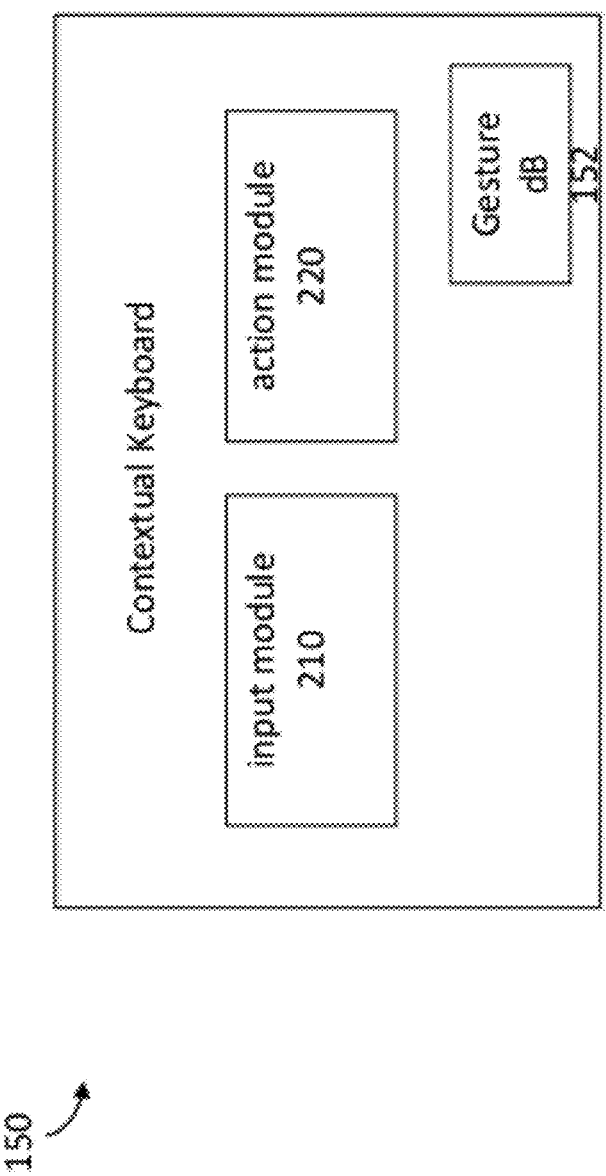
FIG. 2 is a block diagram illustrating components of a keyboard application of a computing device.

FIG. 2 depicts a block diagram illustrating components of a keyboard application 150 of a computing device. The keyboard application 150, sometimes referred to a "contextual keyboard," includes an input module 210, layer, or component configured to receive input and produce a text string, and an action module 220, layer, or component configured to receive input and perform, or cause to perform, one or more actions associated with the received input. In some cases, the keyboard application 150 includes a database 152, such as a database 152 storing information associated with gestures, actionable words (e.g., word macros), actions to perform, and/or other information.

In some examples, the input module 210 includes components of conventional keyboard applications, such as components that may provide a text input functionality, a key tap functionality, a swipe, gesture, and/or contact movement functionality, or any other functionality that facilitates the reception of text-based input from a user. The input module 210 may cause a computing device 100 to display a keyboard via a touch-screen 120, and receive input via a displayed keyboard presented via the touch-screen 120. The keyboard may be a physical keyboard or a virtual keyboard, such as any keyboard that is implemented on a touch-sensitive surface, a keyboard presented on a touch-sensitive display, a keyboard imprinted on a touch-sensitive surface, and so on. Example keyboards include a keyboard displayed on a monitor, a keyboard displayed on a touch-screen, a keyboard optically projected onto a flat or curved surface, or a physical keyboard with electronically changeable key symbols integrated into the keys, and so on. In some cases, the keyboard may be "virtually" touched, such as a screen or projection that is controlled with some sort of pointer device or gesture recognizer. Further details regarding suitable text input applications provided by the input module 210 may be found in commonly-assigned U.S. Pat. No. 7,542,029, issued on Jun. 2, 2009, entitled SYSTEM AND METHOD FOR A USER INTERFACE FOR TEXT EDITING AND MENU SELECTION, which is incorporated by reference in its entirety.

In some examples, a text input application provided by the input module 210 may perform recognition and/or disambiguation techniques to entered text when a user is inputting text. For example, the input module 210 may provide a text input application that receives text entry when a user traces a continuous path on a virtual keyboard. Such as text entry application is described in more detail in U.S. Pat. No. 7,098,896, issued on Aug. 29, 2006, entitled SYSTEM AND METHOD FOR CONTINUOUS STROKE WORD-BASED TEXT INPUT, which is incorporated by reference in its entirety.

Figure 3:
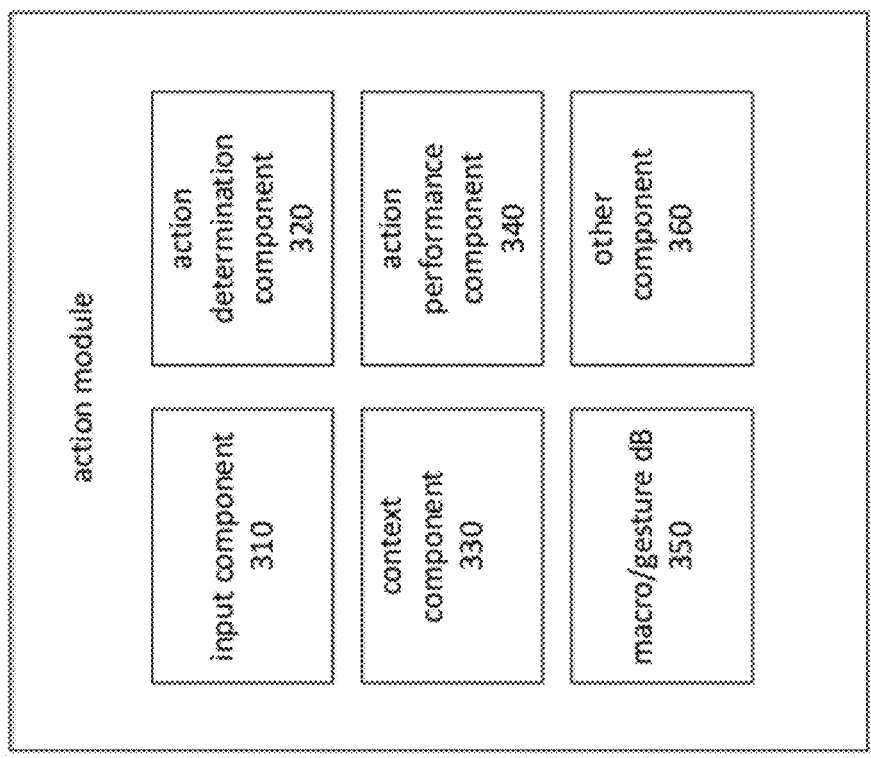
FIG. 3 is a block diagram illustrating components of an action module of a keyboard application.

In some examples, the action module 220 includes components configured to recognize received input as a command to perform an action and components configured to perform, or cause to perform, the action, and not as text input typically added to a text string. FIG. 3 depicts a block diagram illustrating components of the action module 220 of a keyboard application.

The action module 220 includes an input component 310 configured to receive, monitor and/or review input received by the keyboard application, an action determination component 320 configured to determine one or more actions are associated with the received input, a context component 330 configured to identify and/or determine a context associated with the received input, an action performance component 340 configured to perform or cause to perform the determined one or more actions, a database 350 that stores information associated with received input and/or actions to perform, and/or other components that facilitate operation of the action module 220, such as components that communicate with other components of the input module 210 of the keyboard application 150, among other things. Further details regarding the operation of the input module 210, the action module 220, and/or various components within the modules are discussed with respect to the various routines described herein.

In some examples, the input module 210 may provide information to the action module 220, such as information that facilitates recognition of input as being associated with a command to perform an action. For example, the input module 210 may utilize recognition and/or disambiguation techniques to identify a user's intentions when entering text. Such techniques may identify partially entered text as a possible command before the text is output to an active application as ordinary text, and provide such information to the action module 220. Thus, the action module 220 may intercept text before it is sent to an active application in order to perform some other action among other benefits.

As described herein, in some examples, the contextual keyboard 150 associates various forms of input with performable actions. For example, the contextual keyboard 150, via the action determination component 320 of the action module 220, may identify one or more "word macros" within a string of text input by a user. A word macro is a text string that is associated with a command, such as an action to be performed. In some cases, the word macro is a text string that is unlikely to be received by the keyboard (e.g., "emz"). In some cases, the word macro is a text string that is similar to an ordinary word or words (e.g., "email") of a user's language.

Often, a word macro will be received after or during a certain amount of text input is received or selected via the keyboard. The action module 220 may utilize the selected text input as a "seed" when determining whether input is a word macro or ordinary text. The use of text input as seeds is described in greater detail herein.

As another example, the contextual keyboard 150, via the action determination component 320 of the action module 220, may identify one or more "gestures" are received from a user via the keyboard application 150. A gesture is movement of a finger (or stylus) across and/or a screen to enter data on a keyboard, to interact with applications, and/or to indicate various other user intentions. For example, a gesture may be a path traced on or via a virtual keyboard, a shape drawn on or via a virtual keyboard, and/or other movements on or via a virtual keyboard. In some cases, the keyboard application 150 may receive a gesture without any contact between a user and the keyboard. For example, a receive gesture may be a certain movement of the device 100, detected by a gyroscope within the device 100, or a movement of a pointer over a virtual display, detected by a camera of the device 100.

The action module 220 may store information associated with various word macros and/or gestures in a database, such as macro/gesture database 350, or gesture database 152. The stored information may include information associating word macros to performable actions, information associated gestures to performable actions, information associated with user settings (e.g., account information for a user or preference information for a user), and so on. Such information may enable the action module 220 to determine and perform actions based on commands received during the ordinary entry of text into the device 100 via the keyboard application 150, among other benefits.

Figure 4:
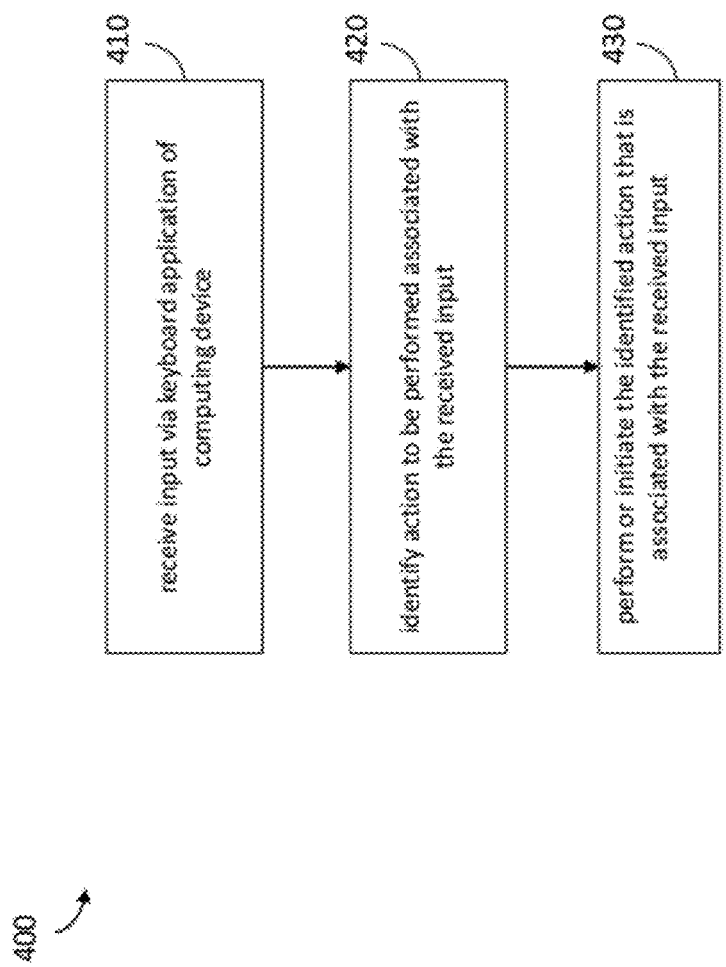
FIG. 4 is a flow diagram illustrating a routine for performing an action via a keyboard application.

FIG. 4 is a flow diagram illustrating a routine 400 for performing an action via a keyboard application. In step 410, the contextual keyboard of a computing device receives input via a keyboard of the device. For example, the input component 310 of the action module 220 monitors contact events at the contextual keyboard and receives input associated with the contact event. The received input may be in the form of a word macro, a gesture, or other input.

For example, the contextual keyboard enables a user to perform a gesture that tells the contextual keyboard what action to perform, perform a gesture that brings up a menu of user-selectable actions to perform, perform a gesture and use the keyboard to choose what action to perform, and/or use the keyboard to type a "word macro," and so on.

In step 420, the contextual keyboard identifies one or more actions to be performed are associated with the received input. For example, the action determination component 320 of the action module 220 identifies and/or determines that the received input is stored in database 350 and associated with an action to perform. The identified actions may be associated with searching for information, linking to information, storing information, posting information, launching an application, and so on.

In some cases, the contextual keyboard may associate actions to perform to received input that is specific to an application or other computing environment in which a user is working or is currently in use on a device. That is, certain word macros and/or gestures may be application specific, only considered to be word macros or gestures within that application. For example, a text editor application may support gestures associated with performing an action to print or render a document into a pdf version, while other applications may not support such a gesture.

In some cases, the contextual keyboard may identify that two or more actions are associated with received input. For example, in response to a received word macro of "email," the action determination component 320 may identify a first action associated with sending an email with a user's personal email account as well as a second action associated with sending an email with the user's company email account. In order to resolve the ambiguity, the contextual keyboard may present a menu of options to the user that are associated with the available actions to be performed or may select the most likely action to be performed based on various context information, among other things. For example, the contextual keyboard may make a guess, based on the user's past history of choices, and decide whether to make a guess or prompt a user to choose an option, use context to help guess (e.g. entering "call" with a number to the left might be guessed to mean "take action—call this number", whereas indicating "call" with "I will" to the left might be intended as content), and so on.

In step 430, the contextual keyboard performs or initiates the identified (or selected) action that is associated with the received input. For example, the action performance component 340 of the action module 220 performs, or causes to perform, the action identified by the action determination component 320. Performing the action may include causing an application to launch, such as launching a text messaging application, transmitting entered text to a website, such as to a social networking site, storing information in a local database, such as storing entered text into a user's contacts database, augmenting the entered text, such as adding links, maps, images, and/or other context to a message, and so on.

That is, in some examples, the contextual keyboard performs actions that result in applications executing in a runtime system or environment of a computing device. For example, a performed action may begin in a keyboard application and cause an application in the run-time system to launch and perform one or more tasks, such as access a website over the internet, send a message over a cellular communications channel, and so on. Examples actions that may be performed include:

Sending a query to a search engine via an associated application running on the computing device;

Posting information to a website (e.g., to a social network, online community, microblog, and so on) via an associated application running on the computing device;

Storing information within a local or remote database;

Sending a message or other information to a recipient;

Retrieiving content and updating text, such as text within an email message, with the retrieve content; or Interacting with a website or other networked location, such as to place or update an order, purchase an item; and so on.

Thus, in some examples, the contextual keyboard facilitates the performance of actions, such as actions performed in or via various applications provided by a computing device, when a certain word macro or gesture is received from a user via a displayed keyboard of the computing device.

As described herein, in some examples, a user inputs a word macro or gesture in order to cause the contextual keyboard to perform an action associated with ordinary text, such as text input via the contextual keyboard, or text presented to the user via an application. For example, the user may wish to perform an action for a portion of text previously inputted into the device via the contextual keyboard or for a portion of text that is part of a page or document presented by an application of the device. This portion of text may act as a "seed" for the contextual keyboard, and the contextual keyboard may use the seed to determine what actions to perform in response to a received word macro or received gesture.

Many of the functions performed by the contextual keyboard utilize or rely on seeds. Seeds may be either implicit or explicit. An explicit seed may be all or most of the visible text on the screen, or a highlighted or otherwise selected portion of the visible text on the screen. An implicit seed may be any other type of information available in a current context, such as the author of an email message, a phone number in a call log, a geographical location, and so on.

In some cases, the user explicitly indicates a portion of text is to be considered a seed. For example, the user may highlight a portion of text, indicating the text is to be used by the contextual keyboard as a seed. Other explicit indications may include performing a gesture at or near the location of a portion of text, including the portion of text in a word macro, and so on.

In some cases, the contextual keyboard determines whether a portion of text, or other information, is to be used as a seed. Such determination may be an implicit determination, because the contextual keyboard implies certain information or context based on possible context acting as a seed. For example, a portion of text may include an address, and the contextual keyboard may determine the address is an implicit seed to consider when determining what actions to perform in response to a received gesture. Implicit seeds may include text indicative of people, places, or things, text in foreign languages, text in a user's database, text unknown to the user, and so on.

As another example, the contextual keyboard may consider other information as being a seed with which to assist in determined actions to perform in response to a received command. For example, the contextual keyboard may consider context information, such as information identifying the location of the computing device, information associated with the application currently in use, information associated with the content of an application currently in use, information associated with previously performed actions, information associated with user preferences, and so on.

Figure 5:
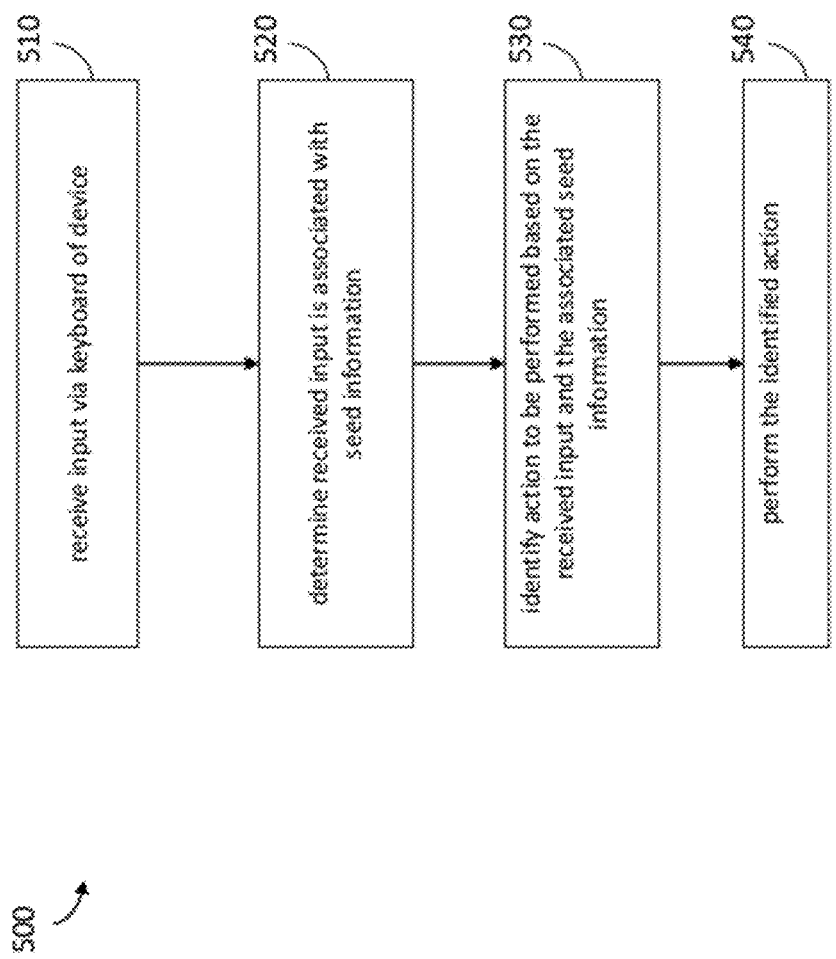
FIG. 5 is a flow diagram illustrating a routine for performing an action associated with a seed.

FIG. 5 is a flow diagram illustrating a routine 500 for performing an action associated with a seed. In step 510, the contextual keyboard receives input via a keyboard of the device. The received input may be in the form of a word macro, a gesture, or other input.

In step 520, the contextual keyboard determines whether the received input is associated with seed information. For example, the context component 330 of the action module 220 may determine whether there is an explicit indication of a seed (e.g., a portion of text is highlighted), an implicit indication of a seed (e.g., a phone number is contained by an application in use on the computing device), or combinations thereof.

In step 530, the contextual keyboard identifies and/or determines one or more actions to be performed based on the received input and the associated seed information. For example, the action determination component 320 of the action module 220 may identify two or more performable actions (e.g., search for information and store information in contact database) are associated with a received gesture (e.g., a gesture to search for content), and select one of the actions (e.g., store information in contact database) based on the seed information (e.g., a phone number is highlighted in an email).

In step 540, the contextual keyboard performs or initiates the identified action that is associated with the received input and the seed information. For example, the action performance component 340 of the action module 220 performs, or causes to perform, the action (e.g., stores the highlighted phone number in a contact database) identified by the action determination component 320.

Thus, in some examples, the contextual keyboard determines actions to perform based on received input and based on seed information, such as information explicitly indicated to be seed information, information implicitly determined to be seed information, and so on. The contextual keyboard, therefore, may adapt actions to perform based on explicit or implicit contexts associated with how a user is utilizing his/her computing device, among other things.

Figure 6:
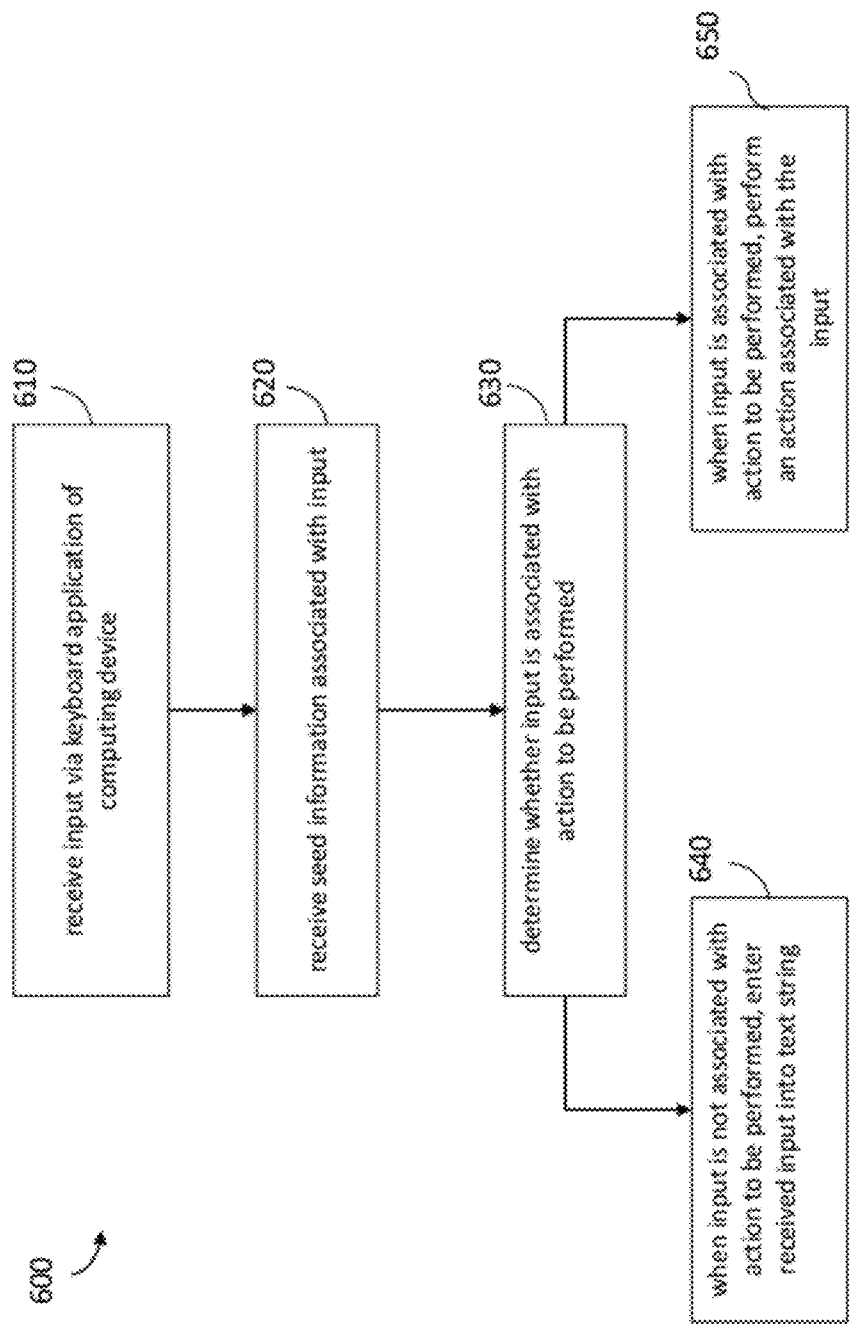
FIG. 6 is a flow diagram illustrating a routine for determining whether entered text is a command or part of a text string.

In some examples, the contextual keyboard may utilize explicit or implicit seed information when determining whether received input is treated as a command or treated as an entry of text. FIG. 6 is a flow diagram illustrating a routine for determining whether entered text is a command or part of a text string.

In step 610, the contextual keyboard receives input via the keyboard of the computing device. For example, the contextual keyboard, via the input component 310 of the action module 220, receives input that includes a possible word macro, such as "send"

In step 620, the contextual keyboard receives seed information associated with the received input. For example, the contextual keyboard, via the context component 330 of the action module 220, identifies various possible seeds, such as other words input by a user, the location of the computing device, the content of an webpage currently viewed by a user, and so on.

In step 630, the contextual keyboard determines whether the received input is associated with an action to be performed. That is, the contextual keyboard utilizes the seed information to determine whether entered text is a word macro or ordinary text. The contextual keyboard, via the action determination component 320 of the action module 220, may determine that the entered text is associated with an action to perform based on the seed information, and routine 600 proceeds to step 650, else routine 600 proceeds to step 640.

In step 640, the contextual keyboard, upon determining that the received input was not associated with a word macro, enters the received input as ordinary text. For example, the contextual keyboard determines that the received input "send" was not a word macro because it was part of a text string, such as "do not forget to send your mother a card" that the user was writing into a calendar entry, and enters the string into the calendar entry.

In step 650, the contextual keyboard, upon determining that the received input was in fact associated with a word macro, performs an action associated with the input. For example, the contextual keyboard determines that the received input "send" was received after a text string of "See you tonight at the game!" was entered, and sends the text string as a message to a friend of the user.

Thus, the contextual keyboard enables a user to explicitly indicate a seed or intended action, or the contextual keyboard may automatically determine a user's intent by determining a correlation between an entered word and a presence of an explicit or implicit seed that is an appropriate target for using the entered word as a command, among other things.

For example, depending on the nature of the command, the contextual keyboard may determine the most explicit current seed in a processing environment. In some cases, the contextual keyboard may identify two or more seeds as possible targets for a received input, and present and/or display the identified seeds to facilitate selection by the user of the desired seed. The contextual keyboard may present the list in a variety of ways, such as a menu of possible seeds ordered from most explicit to least explicit, a menu of possible actions based on the possible seeds, and so on.

The system, therefore, may provide a contextual keyboard that facilitates the performance of actions based on a seed targeted by received input, such as a gesture or a word macro. The following is a list of example actions that may be performed on seeds targeted by input received by the contextual keyboard:

Performing an online search of the content within a seed, such as a search of content at a search engine, social networking site, and so on;

Creating a link to a website associated with the content of a seed and inserting the link in a message;

Populating a message, such an email message or text message, with the content of the seed, and sending the message;

Making a phone call to a phone number associated with the content of a seed;

Making a payment to an individual or business associated with a seed using a payment application;

Getting a map of a location associated with the content of a seed;

Storing the content of a seed, such as a name and phone number, in a database of the computing device; or Retrieving information associated with the content of a seed from a database of the computing device; and so on.

Of course, one of ordinary skill in the art will realize that the system described herein may perform other actions and use other indications as seeds.

Word Macros

Figure 7:
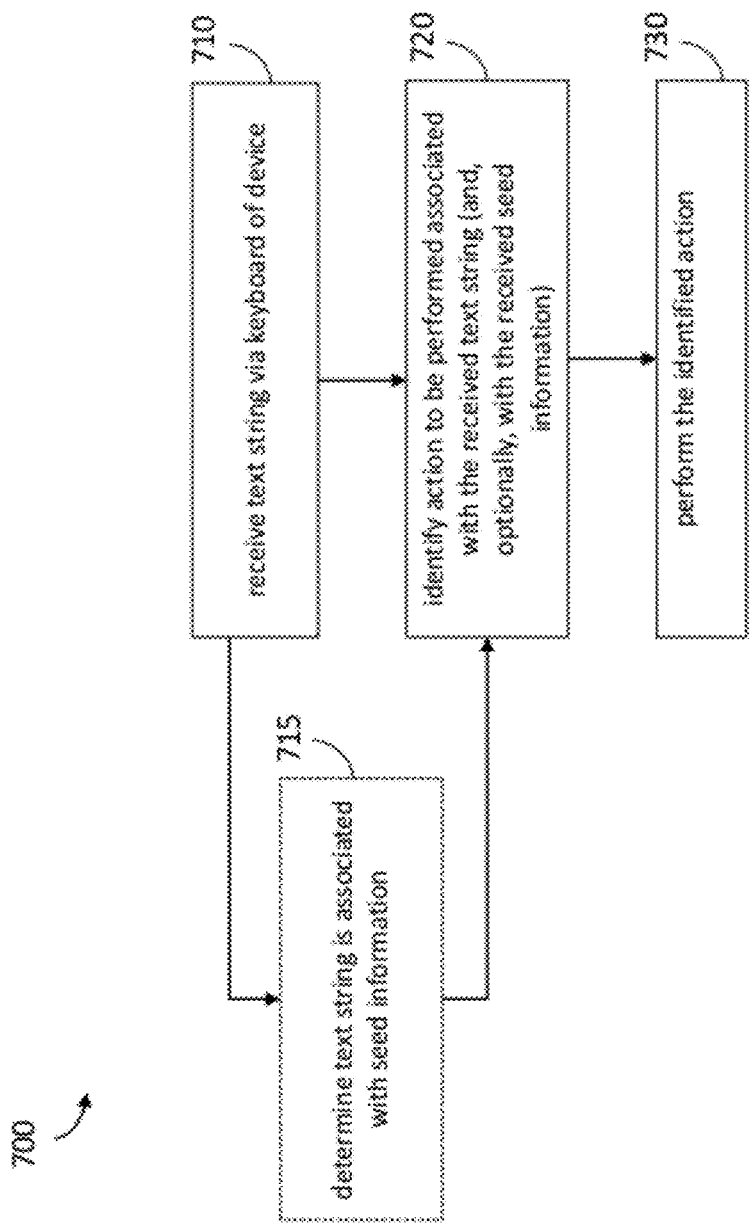
FIG. 7 is a flow diagram illustrating a routine for performing an action based on entered text via a keyboard application.

As described herein, in some examples, the contextual keyboard utilizes word macros as commands to perform actions. FIG. 7 is a flow diagram illustrating a routine 700 for performing an action based on entered text via a keyboard application. In step 710, the contextual keyboard receives a text string via a keyboard of a computing device. The text string may be a word macro, one or more words or phrases associated with actions to perform and/or initiate by the contextual keyboard.

In step 715, the contextual keyboard optionally determines the received text string is associated with seed information. For example, as described herein, the contextual keyboard may determine that a portion of text is selected, or a portion of text includes content indicative of a seed.

In step 720, the contextual keyboard identifies and/or determines one or more actions to be performed that are associated with the received text string (and, optionally, with the received seed information). The contextual keyboard may look to a table, list, or other data structure associating word macros, seeds, and/or performable actions when determining the actions to perform in response to the received text string. The following table (Table 1) presents an example data structure utilized by the contextual keyboard in order to determine what actions to perform:

| Word Macro | Action to Perform | Seed? |
| --- | --- | --- |
| Send | present menu of messaging options | No |
| Search | Search for content at search engine | Yes |
| Save | Save information in database | Yes |
| Map | Lookup in mapping application | Yes |
| Ping (user) | Send text message to employees | Yes |
| Lucy (user) | Send email to daughter | Yes |

Table 1 includes various entries, each entry storing information associated with a word macro, an action to perform, and whether a seed is necessary to determine whether input text is a word macro. For example, the text entry of "send" is considered by the contextual keyboard to be a word macro associated with an action of "presenting a menu of messaging options" regardless of whether there is a seed present. As another example, the text entry of "ping" is considered by the contextual keyboard to be a user-created word macro associated with an action of "send text message to employees" when a seed is present. Of course, the table may include other word macros or actions not specifically shown in Table 1.

In step 740, the contextual keyboard performs the identified action. For example, in response to receiving a text string of "search" when the name "Sepp Blatter" is highlighted, the contextual keyboard determines using Table 1 that the text string "search" is a word macro associated with an action to perform a search, and performs a search for information about "Sepp Blatter" at a search engine.

Thus, in some examples, the contextual keyboard determines that ordinary text received by a keyboard may be a command to perform an action, such as an action associated with text displayed by a computing device. The contextual keyboard may consider such text a word macro, and operate accordingly.

Gestures

Figure 8:
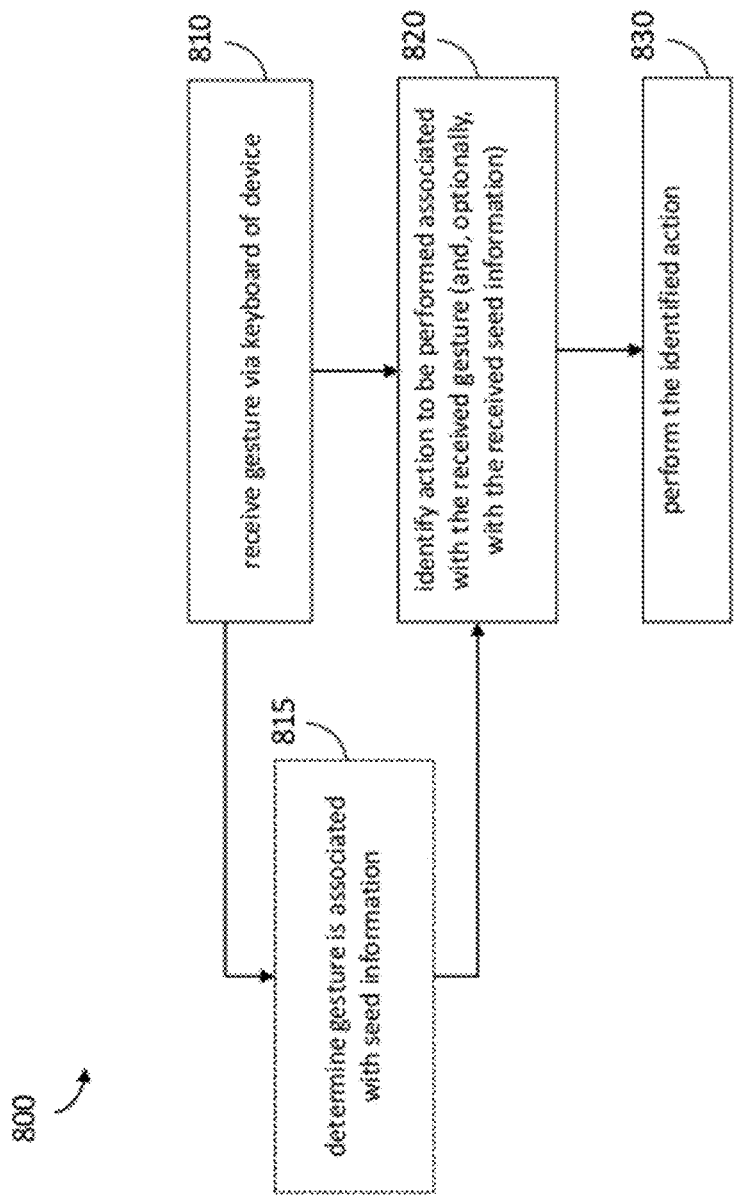
FIG. 8 is a flow diagram illustrating a routine for performing an action associated with a gesture received via a keyboard application.

As described herein, in some examples, the contextual keyboard utilizes gestures as commands to perform actions. FIG. 8 is a flow diagram illustrating a routine 800 for performing an action associated with a gesture received via a keyboard application.

In step 810, the contextual keyboard receives a gesture via a keyboard of a computing device. The gesture may be a certain movement across the keyboard, such as a movement from a starting key to a second key on the keyboard, a path across certain keys on the keyboard, a shape, a figure, a handwritten character, and so on.

In step 815, the contextual keyboard optionally determines the received gesture is associated with seed information. For example, as described herein, the contextual keyboard may determine that a portion of text is selected, or a portion of text includes content indicative of a seed.

In step 820, the contextual keyboard identifies and/or determines one or more actions to be performed that are associated with the received gesture (and, optionally, with the received seed information). The contextual keyboard may look to a table, list, or other data structure associating word gestures, seeds, and/or performable actions when determining the actions to perform in response to the received gesture. The following table (Table 2) presents an example data structure utilized by the contextual keyboard in order to determine what actions to perform:

| Gesture | Action to Perform | Seed? |
| --- | --- | --- |
| A box | present menu of messaging options | No |
| Underline | Insert a link to content | Yes |
| Question mark | Search for content | Yes |
| Start key to T-W keys | Send a tweet | Yes |
| Start key to I key | Insert an image | No |
| Handwritten "C" | Add to contact list | Yes |

Table 2 includes various entries, each entry storing information associated with a gesture, an action to perform, and whether a seed is necessary to determine whether the gesture is a command. For example, the gesture of an underline is considered by the contextual keyboard to be a gesture associated with an action of "inserting a link to content" for content within a seed, such as highlighted content. As another example, the gesture of tracing from a start key to the "I" key on a keyboard is considered by the contextual keyboard to be associated with an action of "insert an image" regardless of whether a seed is present. Of course, the table may include other word macros or actions not specifically shown in Table 2.

In step 840, the contextual keyboard performs the identified action. For example, in response to receiving a gesture of a handwritten "C" over a name in an email, the contextual keyboard determines using Table 2 that the gesture is associated with an action to add content to a contact list, and adds the name and other relevant information from the email in a contact list for a user.

Thus, in some examples, the contextual keyboard may perform an action in response to a gesture received at a keyboard, enabling a user to move seamlessly from a keyboard and text entry to other application, such as messaging applications, among other benefits.

In some examples, the contextual keyboard may utilize and/or employ the gesture functionality in order to provide information to a target application, such as metadata or other information that provides context about a user and/or the navigation of the user from one application to another, among other things. FIG. 9 is a flow diagram illustrating a routine 900 for transmitting information to a target application in response to a gesture received by a keyboard application.

In step 910, the contextual keyboard receives a gesture via a keyboard of a computing device. As described herein, the gesture may be a certain movement across the keyboard, such as a movement from a starting key to a second key on the keyboard, a path across certain keys on the keyboard, a shape, a figure, a handwritten character, and so on.

In step 920, the contextual keyboard may identify an application associated with the received gesture. For example, the contextual keyboard, via the action determination component 320 of the action module 220, may determine that the received gesture is associated with an application to which the user would like to navigate.

In step 930, the contextual keyboard determines information to be transferred to the identified application. For example, the context component 330 of the action module 220 may determine that information associated with current usage of an application is to be transferred to the identified application associated with the gesture.

In step 940, the contextual keyboard initiates transfer of the determined information to the identified application. For example, the action performance component 340 of the action module 220 navigates the user to the identified application while transferring information, such as metadata about the user, to the identified application. Such transfer of information may enhance the user experience with the new application, because the new application receives, via the gesture, information identifying a context in which the user arrived at the application, among other benefits.

As an example, a user is writing an email to a friend about the Galaxy, a Los Angeles based soccer club. The user wishes to send a link in the email. The user highlights the word "Galaxy and makes a gesture of a question mark, which is associated with a search for information. The contextual keyboard, via the gesture, transfers the search term "galaxy" to a search engine, along with other information, such as information in the body of the email identifying "soccer" and "tickets" and information indicating the user is a soccer player. The search engine, having the search term and the additional information, is able to perform a more targeted search, and sends results relevant to the soccer club the Galaxy, and doesn't send results for other iterations of "galaxy," such as astronomy related results or smartphones named "galaxy."

Although various gestures have been described herein, one of ordinary skill in the art will realize that the contextual keyboard may recognize virtually any movement on or near a keyboard as a potential gesture that is associated with an action to be performed. In some examples, a user may create gestures to be utilized by the contextual keyboard. The user-created gestures may replace previously supplied gestures, or may augment a group of gestures provided by a computing device.

In some examples, gestures are specific to the type of application currently utilized by a user, the type of device, the user, and so on. That is, a group of gestures may change or be modified based on an application that is in use, based on a type of device, based on user preferences, and so on. For example, an application primary used for reading text (such as a e-book application) may provide additional gestures associated with commenting on various passages within a book being read by a user.

As another example, an application running on a smartphone may enable a limited set of gestures associated with launching other applications, because the size of the screen is small, while the same application running on a tablet device may enable a full set of gestures associated with launching other applications, because the size of the screen is larger.

Thus, adding functionality to the keyboard, such as via a contextual keyboard, enables users to perform actions to content within an application they are using without leaving the application or navigating between various different applications, which can be time consuming and inefficient, among other things. The keyboard, ubiquitous for applications that receive input, may act as a hub in which users perform actions across multiple applications that reside on a device, providing these users with a powerful and efficient mechanism through which they can work, play, communicate, or otherwise utilize the many different capabilities of their devices.

Settings and Functionality of the Contextual Keyboard

As described herein, the contextual keyboard 150 performs many different actions, such as inserting links, sending messages, updating contacts lists, and so on. In order to provide a beneficial experience to a user, the contextual keyboard may include various settings that dictate how the contextual keyboard performs the various actions described herein. The settings, which may be stored in various database associated with the contextual keyboard or a device supporting the contextual keyboard, such as databases 152 or 350, provide information to the contextual keyboard about how to perform various actions. For example, the contextual keyboard may use settings to determine how to insert a link, how to render an image, and so on.

In some examples, the settings may be user defined. That is, a user may define the strings of text that, when entered on a keyboard, cause the contextual keyboard to perform a lookup operation or other action associated with the selected text. Example settings, which in some cases are user-defined, include:

Defining how to provide links, e.g., rendering links in HTML, using a URL shortening service, and so on;

Defining how to populate user databases, such as with phone numbers, email addresses, and so on;

Defining what search engines to use, or what search engines to provide in a menu of choices;

Defining when to present a menu of options when two or more actions are associated with a received gesture;

Defining when to allow the contextual keyboard to choose an appropriate action when two or more actions are associated with a received gesture; or Defining user-specific gestures, word macros, and other input-based commands; and so on.

Thus, the contextual keyboard utilizes settings when determining whether a gesture is associated with an action to be performed, when selecting an appropriate action to be performed, and/or when performing an action in response to received input.

Processes Performed by the Contextual Keyboard

As discussed herein, the contextual keyboard may facilitate a variety of tasks for a user, such as searching for content, posting to a social networking site, storing contact information, and so on. The following scenarios describe example use cases for implementation of the contextual keyboard.

Scenario #1—Searching for Information

Figure 10B:
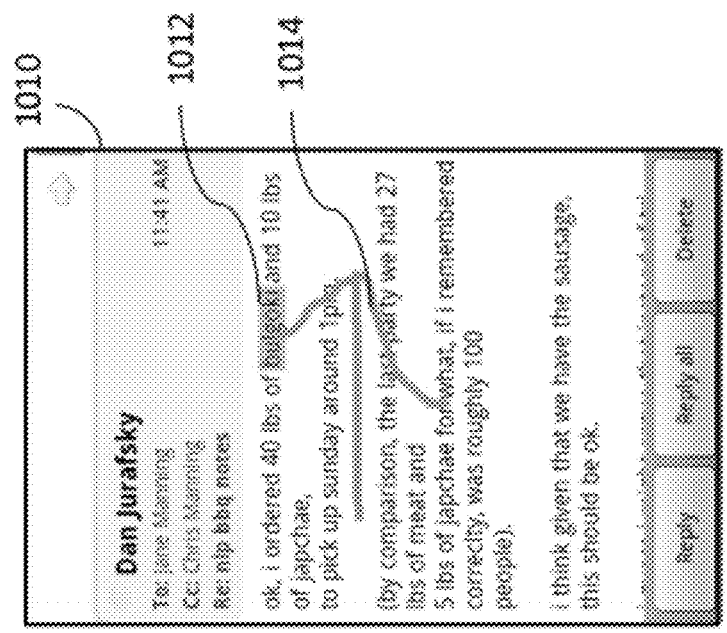
FIGS. 10A-10D are screen shots illustrating steps performed when initiating a search for information.
Figure 10A:
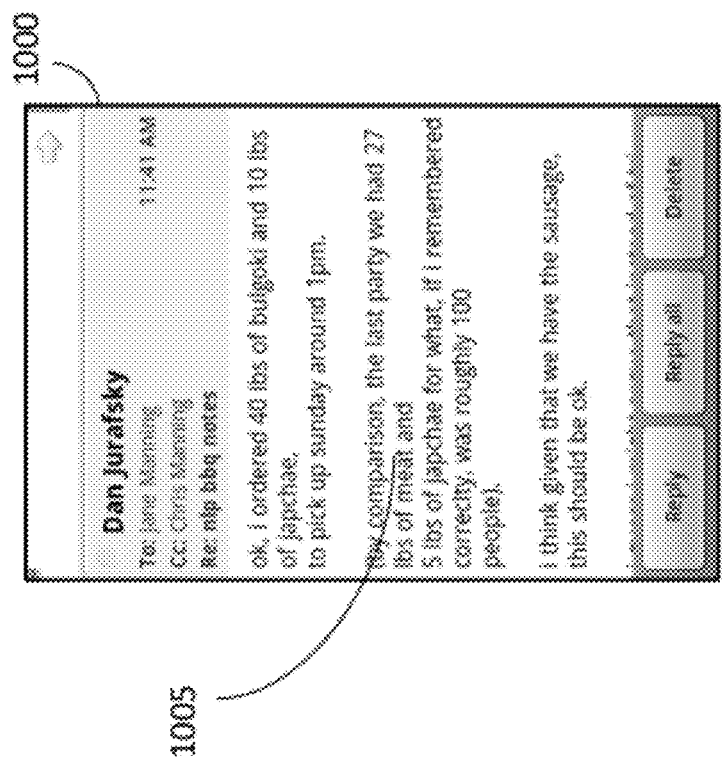
Figures 10C, 10D:
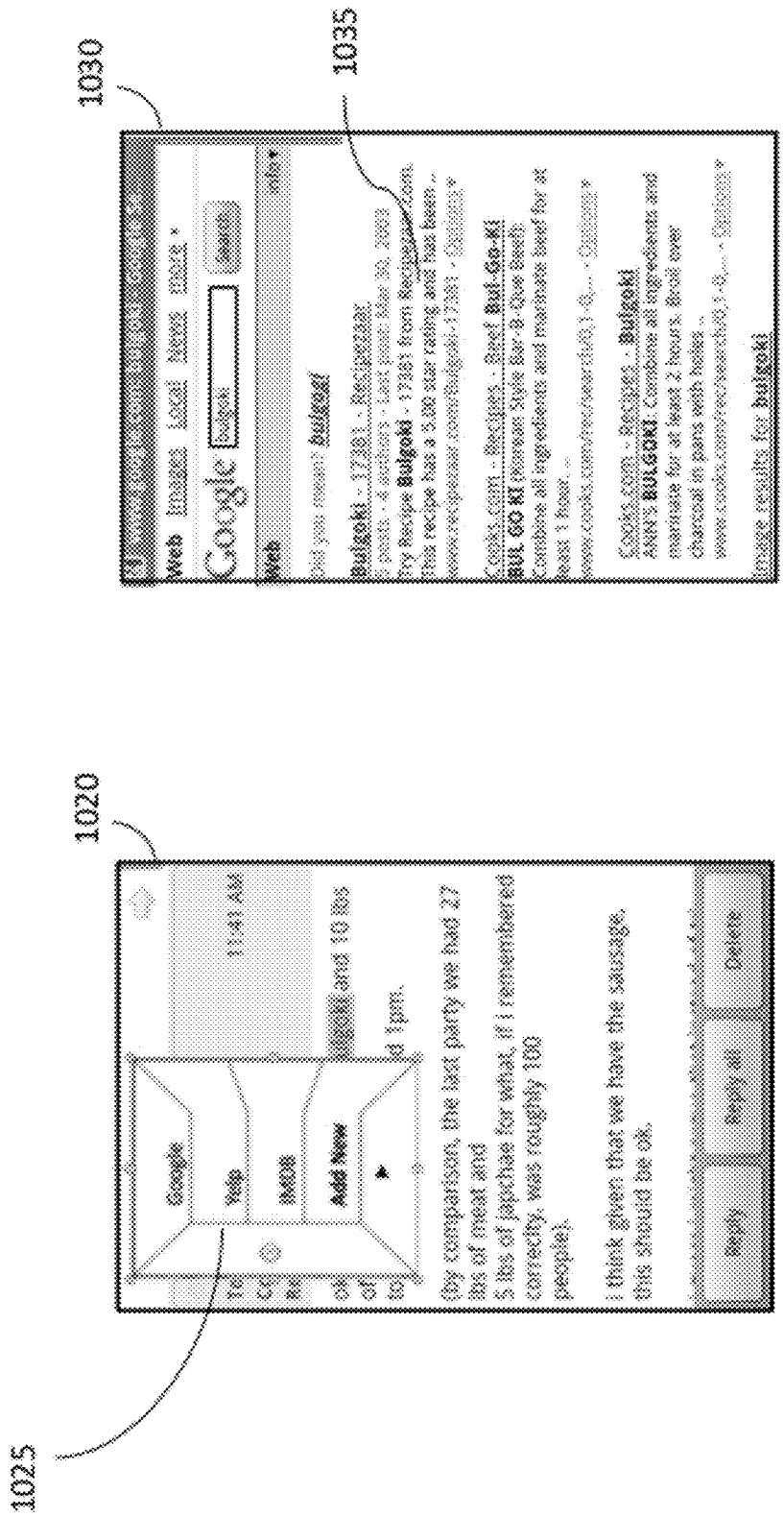

In some examples, the contextual keyboard utilizes gestures to enable users to search for and/or retrieve information associated with content they are reading or typing. FIGS. 10A-10D are screen shots illustrating steps performed using the contextual keyboard when initiating a search for information. FIG. 10A depicts a screen shot 1000 of an email message sent to a user. The email message includes text 1005 in the body of the message. While reading the message, the user wants to learn more about the term "bulgoki." FIG. 10B shows a screen shot 1010 where the term "bulgoki" is highlighted 1012. Once highlighted, the user inputs a gesture of an arrow 1014 by drawing an arrow on the touch-screen. The contextual keyboard, although not shown in the screen shot 1020 of FIG. 10C, launches an on screen menu 1025 of options where the user may wish to search for more information about "bulgoki." Once an option is selected, such as the "Google" option, the contextual keyboard initiates a search for information about "bulgoki" (considered by the contextual keyboard to be a seed) at the Google website, shown in the screen shot 1030 depicted by FIG. 10D. The screen shot 1030 displays various results 1035 of the search. Thus, in some implementations, the contextual keyboard enables a user to perform a gesture while reading an email or other document to learn more about the content of the email, among other benefits.

Figures 11A, 11B:
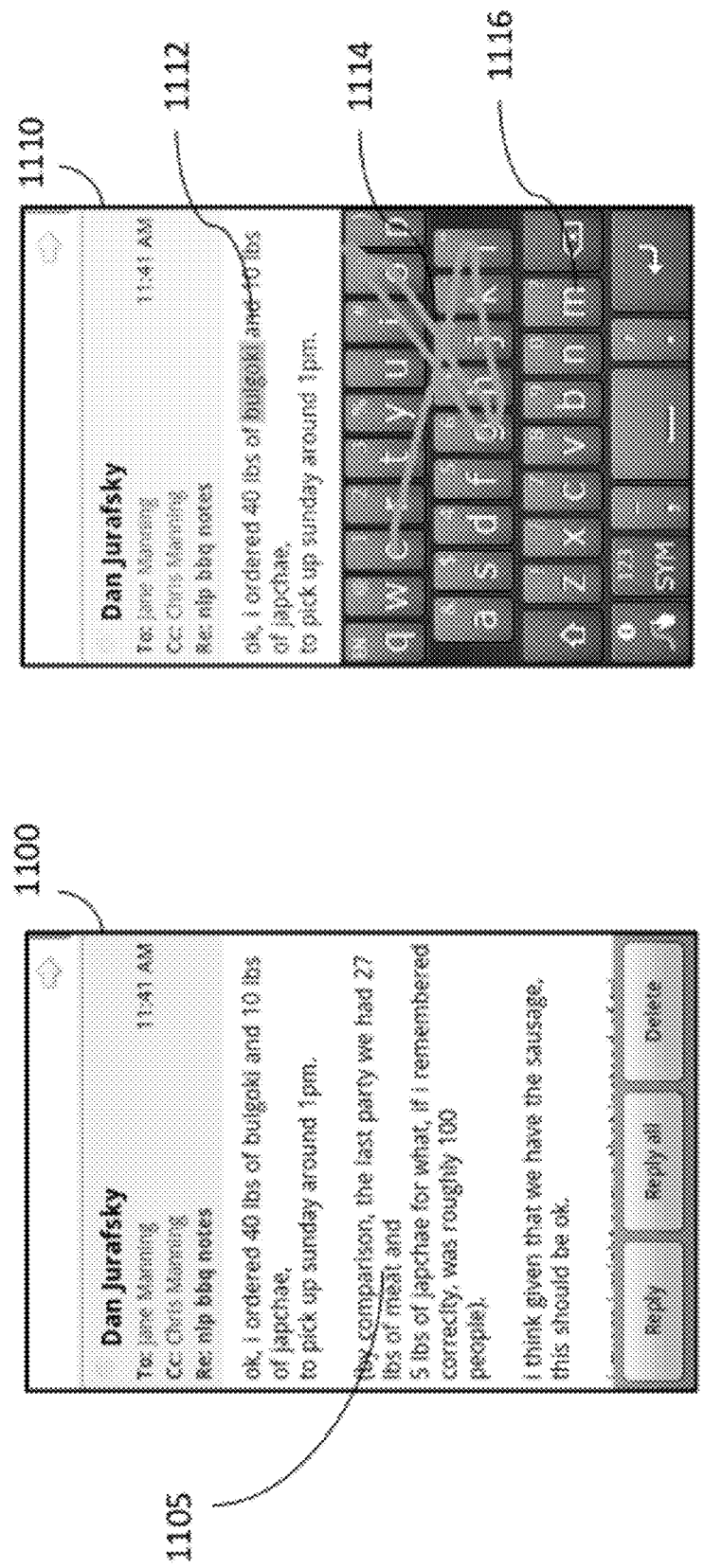
FIGS. 11A-11C are screen shots illustrating steps performed when initiating a search for information.
Figure 11C:
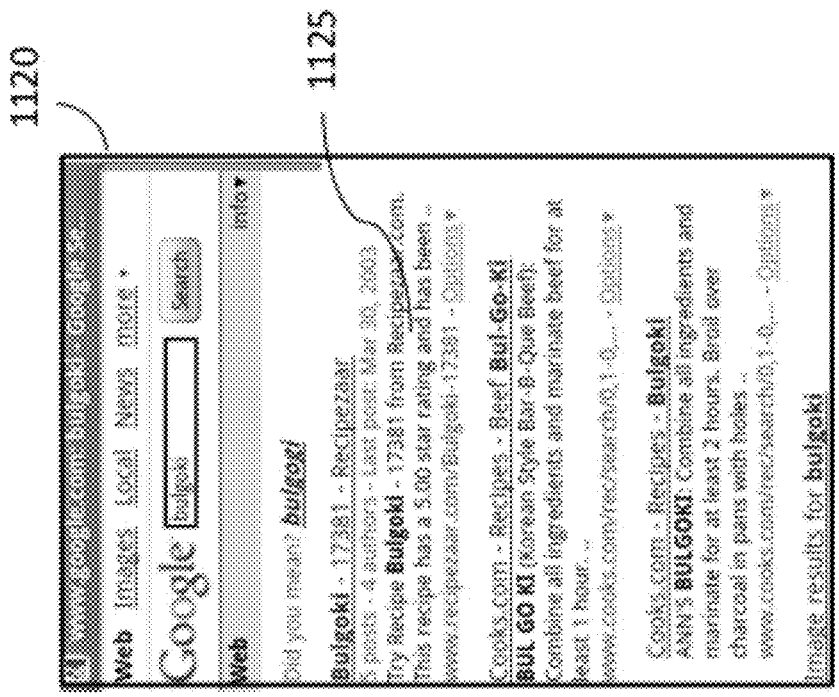

In some examples, the contextual keyboard utilizes word macros to enable users to search for and/or retrieve information associated with content they are reading or typing. FIGS. 11A-11C are screen shots illustrating steps performed using the contextual keyboard when initiating a search for information. FIG. 11A depicts a screen shot 1100 of an email message sent to a user. The email message includes text 1105 in the body of the message. While reading the message, the user wants to learn more about the term "bulgoki." FIG. 11B shows a screen shot 1110 where the term "bulgoki" is highlighted 1112. Once highlighted, the user inputs a text string 1114 of "google" on a displayed keyboard 1116. The contextual keyboard determines the input text is a word macro and initiates a search for information about "bulgoki" at the Google website, shown in the screen shot 1120 depicted by FIG. 11C. The screen shot 1120 displays various results 1125 of the search. Thus, in some implementations, the contextual keyboard enables a user to provide a word macro on a displayed keyboard while reading an email or other document to search for information, among other benefits.

Of course, the contextual keyboard may provide a variety of different options when prompted to search for information. Although Google is shown in the example, other search engines may be utilized, such as other general purpose search engines (e.g., Bing, Yahoo, and so on), consumer review sites (e.g., Yelp), online retailers (e.g., amazon.com), content aggregators, blogs, social networking sites, and so on.

The contextual keyboard may determine and/or suggest one or more of the options based on a variety of factors, such as the type of content within the seed (e.g., when the content indicates a type of food, a food blog such as epicurious.com is selected), historical information about the user (e.g., the user always selects google.com), location information (e.g., when the user is in New York, nyimes.com is selected), the application environment (e.g., when the user is on facebook.com, a search is performed within Facebook) and/or other seed or non-seed information. In some cases, the contextual keyboard may provide a user-definable option. For example, the menu 1025 of FIG. 10C includes an option to "add new," whereby the user may input a desired site in which to carry out the search.

Scenario #2—Enhancing Text

In some examples, the contextual keyboard utilizes gestures to enable users to enhance the content they are reading or typing. FIGS. 12A-12B are screen shots illustrating steps performed when inserting a link or other information into an application. FIG. 12A depicts a screen shot 1200 of a text message being entered into a text messaging application displayed by the device. The text message includes the entered content 1202 and highlighted content 1204, "Tamarine," that the contextual keyboard may use as a seed. A gesture 1206 of a drawn arrow is received as input at the keyboard. As depicted by the screen shot 1210 of FIG. 12B, the contextual keyboard, in response to the received gesture 1206 and the highlighted seed content, determines that the gesture 1206 is associated with an action to retrieve a link to information about the content, the restaurant "Tamarine," and insert the link 1214 to the retrieved content into the body 1212 of the message. Thus, in some implementations, the contextual keyboard uses gestures to enable a user to enhance previously written or currently written content with links and other content, among other benefits.

In some examples, the contextual keyboard utilizes word macros to enable users to enhance the content they are reading or typing. FIGS. 13A-13B are screen shots illustrating steps performed when inserting a link or other information into an application. FIG. 13A depicts a screen shot 1300 of a text message being entered into a text messaging application displayed by the device. The text message includes the entered content 1302 and highlighted content 1304, "Tamarine," that the contextual keyboard may use as a seed. A word macro 1306 of "linkyelp" is received as input at the keyboard. As depicted by the screen shot 1310 of FIG. 13B, the contextual keyboard, in response to the received word macro 1306 and the highlighted seed content, determines that the word macro 1306 is associated with an action to retrieve a link to information about the content, the restaurant "Tamarine," from the website yelp.com and insert the link 1314 to the retrieved content into the body 1312 of the message. Thus, in some implementations, the contextual keyboard uses word macros to enable a user to enhance previously written or currently written content with links and other content, among other benefits.

Of course, one of ordinary skill in the will appreciate that the contextual keyboard may facilitate the insertion or replacement of various other content within a message or other portion of text and/or content. For example, in addition to links to content, the contextual keyboard may facilitate the insertion of images, video files, audio files, documents, additional textual content, and so on. For example, a user inputting a word macro "def" when the text phrase "communal table" is highlighted may cause the contextual keyboard to insert a definition for communal table within the message. As another example, a user inputting a gesture of a circle after typing the word "resume" may cause the contextual keyboard to attach a pdf file of the user's resume along with the message being typed.

Figure 14B:
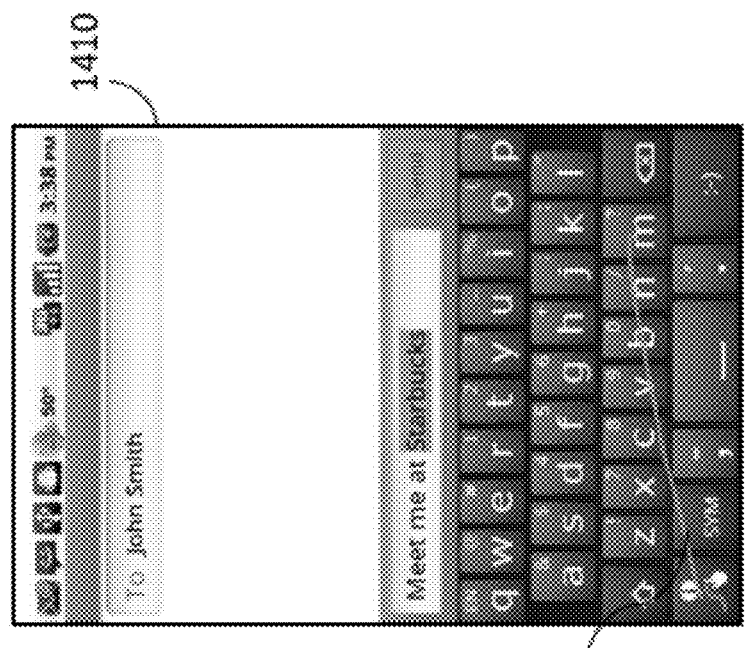
FIGS. 14A-14D are screen shots illustrating steps performed when inserting a map or other information into an application.
Figure 14A:
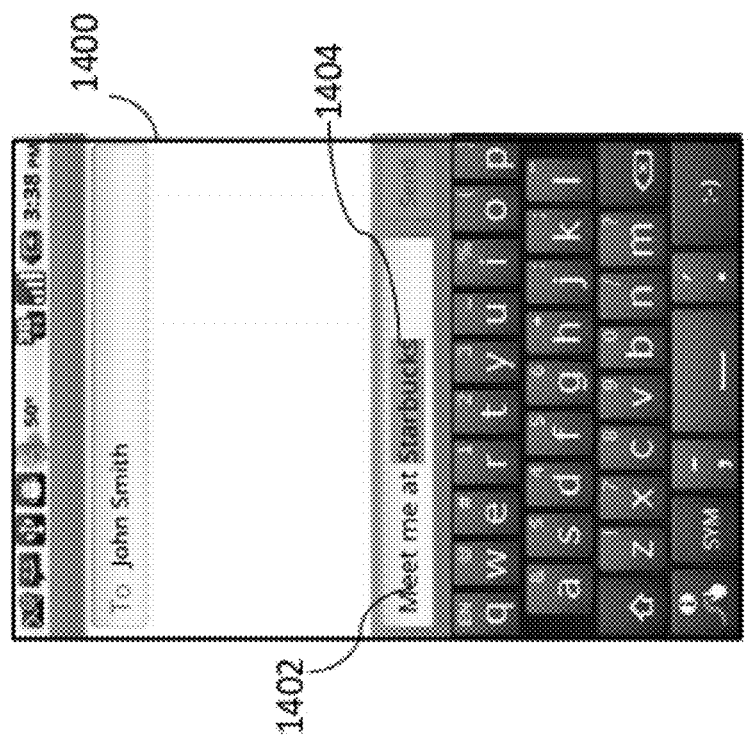
Figure 14D:
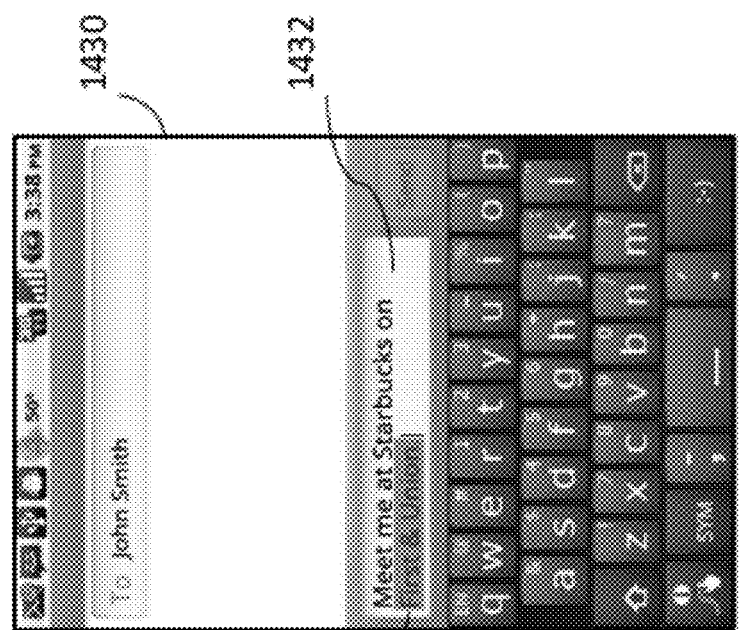
Figure 14C:
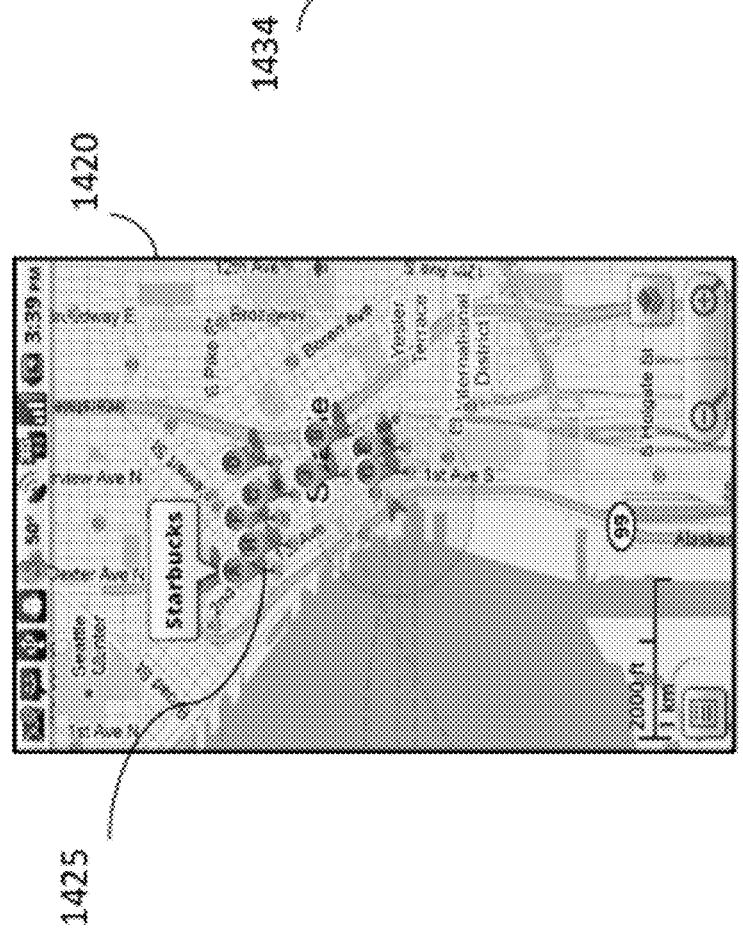

The contextual keyboard may assist a user in retrieving information and linking to the retrieved information while the user is entering text of a message. FIGS. 14A-14D are screen shots illustrating steps performed when inserting a map or other information into an application. FIG. 14A depicts a screen shot 1400 of a user entering text 1402 into a messaging application. The contextual keyboard anticipates and highlights 1404 the word "Starbucks," determining, based on a number of factors (e.g., the syntax of the sentence, the user's history) that the user will add information about the location of the Starbucks in the message. As shown in the screen shot 1410 of FIG. 14B, the user performs a gesture 1415 of drawing a path from a gesture key to the "m" key. In response to the gesture 1415, the contextual keyboard determines that the user is seeking to view a map of Starbucks locations in the user's area, shown in the screen shot 1420 of FIG. 14C. That is, the contextual keyboard uses the seed of "Starbucks," the receives gestures, and the location context of the user's device to determine that the user is requesting a map of nearby Starbucks coffee shops, and presents the map 1425 to the user. Once the user selects a location, the contextual keyboard updates the message 1432, shown in the screen shot 1430 of FIG. 14D, with the address information and a link to the map 1434 of the selected location.

Thus, the contextual keyboard may use explicit seeds (e.g., words indicated to be seeds by received input, such as a highlight, from a user) and/or implicit seeds (e.g., words indicated to be seeds based on a determination by the contextual keyboard), when determining what actions to perform in response to a word macro, a gesture, or other input treated as a command.

Scenario #3—Storing Information

Figure 15B:
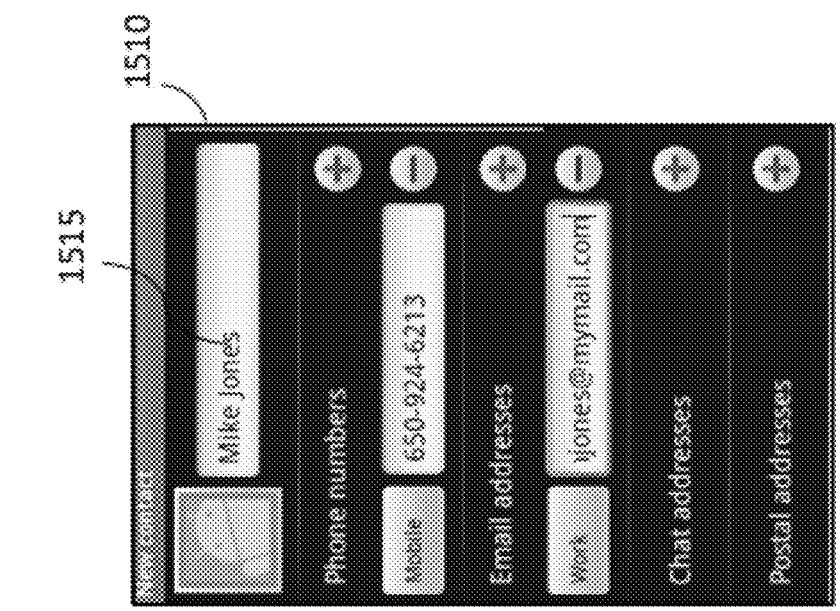
FIGS. 15A-15B are screen shots illustrating steps performed when storing information in a database.
Figure 15A:
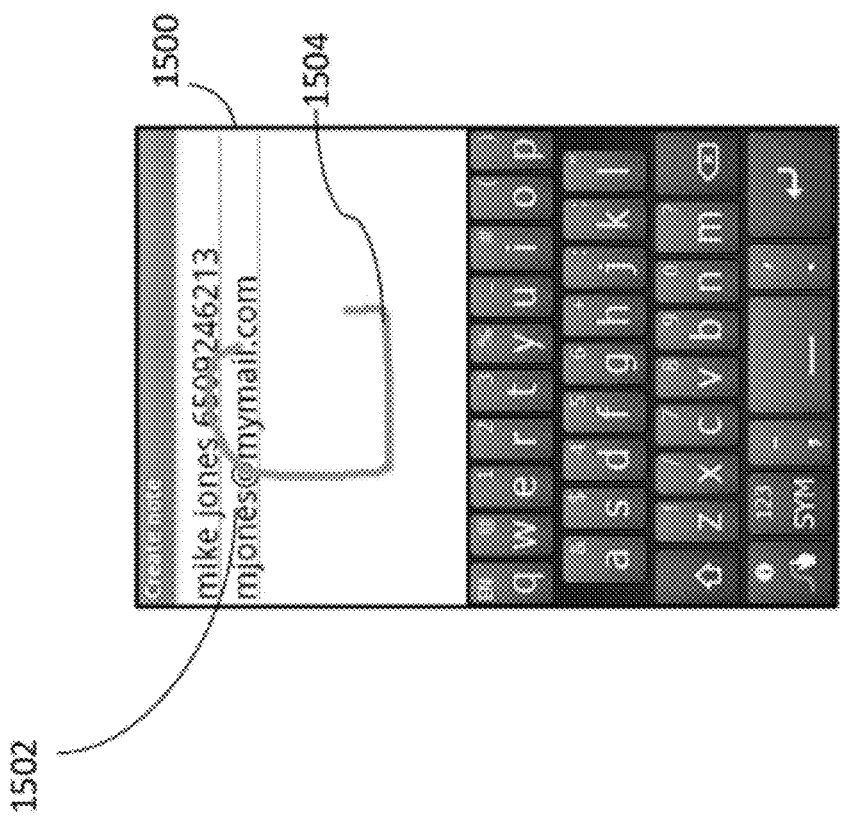

In some examples, the contextual keyboard utilizes gestures to enable users to store content and other information they are reading or typing, such as content received in messages, content read on a webpage, and so on. FIGS. 15A-15B are screen shots illustrating steps performed when storing information in a database. In FIG. 15A, a screen shot 1500 presents an email message that includes contact information 1502 for "Mike Jones." A user wishes to store the information in his/her contact database, and inputs a gesture 1504 of a handwritten "C" on the keyboard. The contextual keyboard, as shown in the screen shot 1510 of FIG. 15B, determines that the received gesture 1504 is associated with an action to store information, and inserts the contact information 1502 as a new contact 1515 in the user's contact list. Thus, in some implementations, the contextual keyboard uses gestures to enable a user to store information from messages, documents, and other text presented to a user on his/her device, among other benefits.

In some examples, the contextual keyboard utilizes word macros to enable users to store content and other information they are reading or typing, such as content received in messages, content read on a webpage, and so on. FIGS. 16A-16B are screen shots illustrating steps performed when storing information in a database. In FIG. 16A, a screen shot 1600 presents an email message that includes contact information 1602 for "Mike Jones." A user wishes to store the information in his/her contact database, and inputs a word macro 1604 by tracing the word "contacts" on the keyboard. The contextual keyboard, as shown in the screen shot 1610 of FIG. 16B, determines that the received word macro 1604 is associated with an action to store information, and inserts the contact information 1602 as a new contact 1615 in the user's contact list. Thus, in some implementations, the contextual keyboard uses word macros to enable a user to store information from messages, documents, and other text presented to a user on his/her device, among other benefits.

In addition to contact information, the contextual keyboard may facilitate storing other types of information in various databases within a user's device. For example, a user may select a textual description of an event presented by a webpage, and command the contextual keyboard, via an input gesture or word macro, to create an entry in the user's calendar for the event. The contextual keyboard, upon receiving a command input, performs an action to create a calendar entry for the user with the event information already populated in the entry.

In some examples, the contextual keyboard may utilize and/or retrieve information already stored in device databases in response to commands received via the keyboard. For example, a user may be typing an email and want to insert contact information for a party that is cc'ed to the email. To do so, the user may highlight the name of the party and input a word macro of "addcon," which causes the contextual keyboard to retrieve the contact information of the party from the user's contact list and insert the contact information into the email.

In some examples, the contextual keyboard may utilize and/or retrieve information measured, sensed, and/or captured by a device in response to commands received via the keyboard. Such information may include geographical location information (e.g., longitude and latitude information), relative location information (e.g., a user's proximity to a certain landmark or street), temperature and other weather information, altitude information, velocity information, time information, images or other data captured by cameras of the device, and so on. For example, a user taking a trip around the world may send emails to his/her parents at various times during the trip. When writing the emails using a contextual keyboard, the user may perform a gesture (e.g., draw a checkmark on the keyboard of the device) that causes the contextual keyboard to retrieve from the device and insert certain information at the end of the email, such as: "The traveler is in Bratislava, Slovakia. It is 34 degrees outside, with light rain." Thus, the contextual keyboard may facilitate the addition of various types of information without causing the user to look up or measure such information, saving the user time and effort while enhancing the user's messages, among other benefits.

Scenario #4—Posting Information

Figures 17A, 17B:
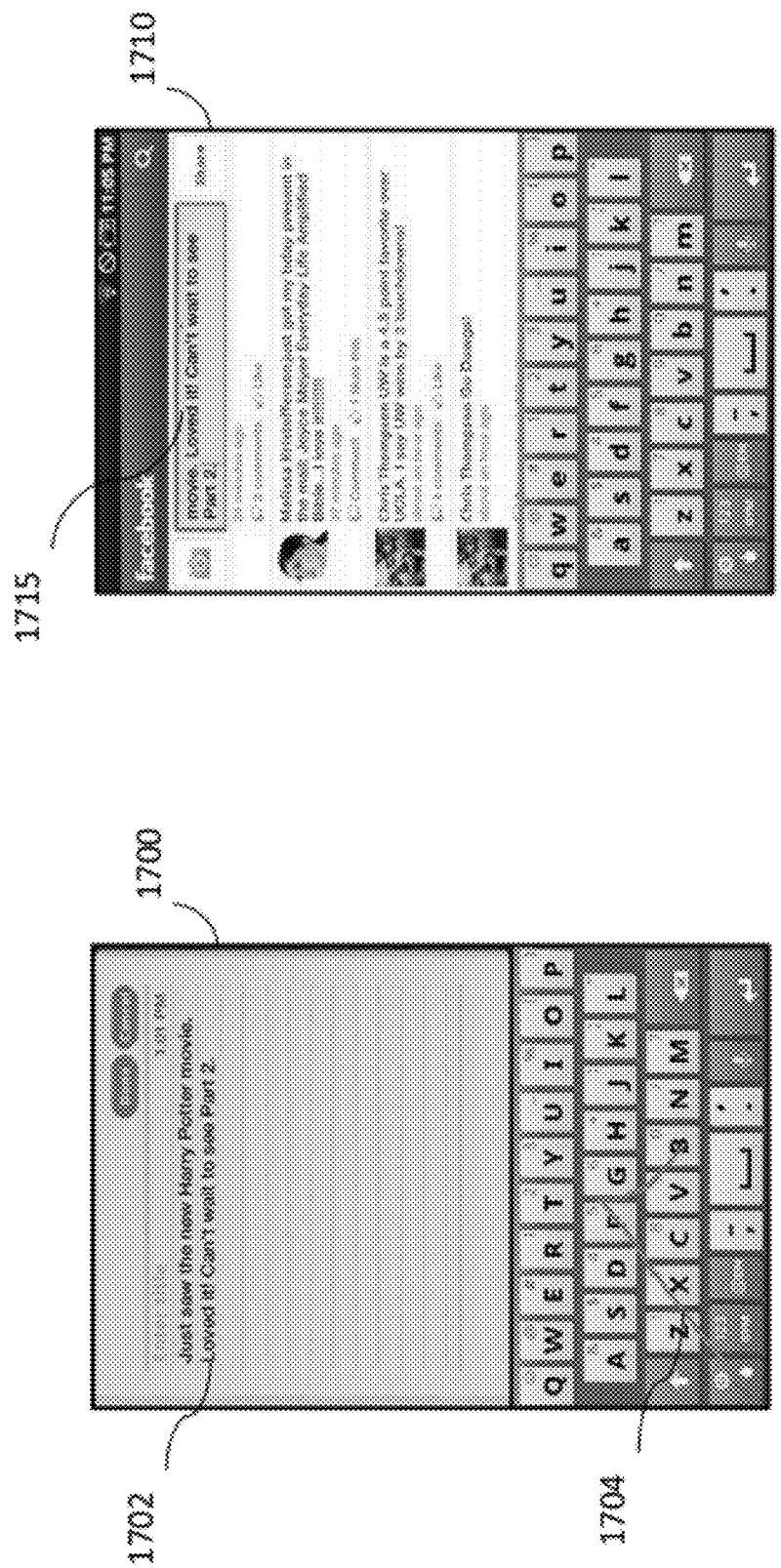
FIGS. 17A-17B are screen shots illustrating steps performed when posting information to a website or other location.

In some examples, the contextual keyboard utilizes gestures or word macros to enable users to post content or other information to various locations, such as to webpages, blogs, social network sites, and so on. FIGS. 17A-17B are screen shots illustrating steps performed when posting information to a website or other location. FIG. 17A depicts a screen shot 1700 of a notepad or other text editor application, in which a user has entered text 1702, such as a short review of the latest Harry Potter movie. The user wishes to post this message to a variety of different social network sites and blogs, and performs a gesture on the keyboard to do so. FIG. 17A depicts a first gesture 1704 of a trace path from a start key to the keys "F-B." Alternatively, the user may have traced or typed a word macro of "facebook" to input a similar command to the contextual keyboard. The contextual keyboard determines that the gesture 1704 is associated with an action to post the text to a user's Facebook page, and, as shown in the screen shot 1710 of FIG. 17B, updates, or initiates an update of, the user's status 1715 on his/her Facebook page.

Figures 18A, 18B:
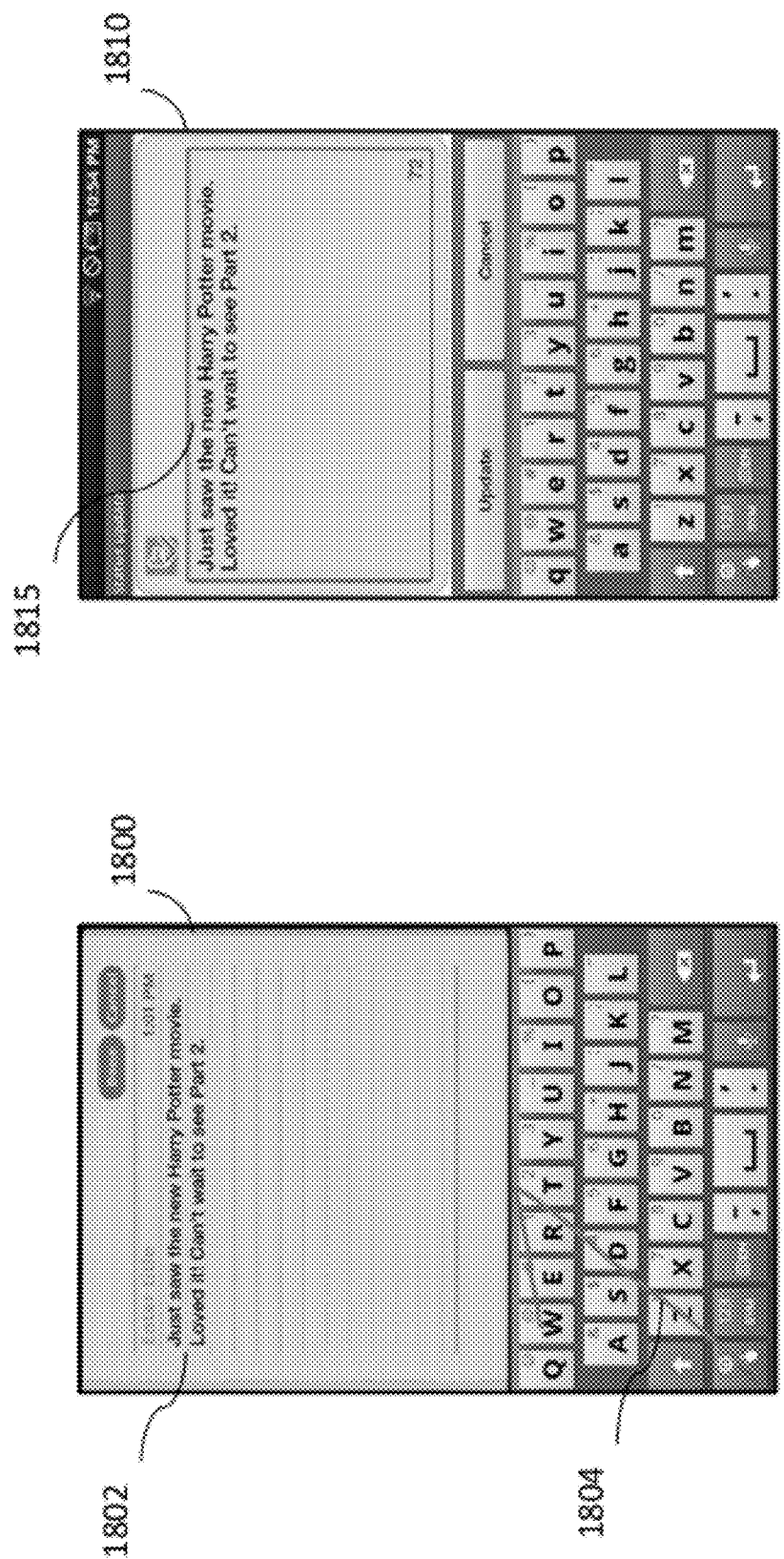
FIGS. 18A-18B are screen shots illustrating steps performed when posting information to a website or other location.

Next, as shown in the screen shot 1800 of FIG. 18A, the user wishes to post the same message 1805 to his/her Twitter feed, and again performs a gesture on the keyboard to so, namely a second gesture 1804 that is a trace path from a start key to the keys "T-W." Alternatively, the user may have traced or typed a word macro of "tw" to input a similar command to the contextual keyboard. The contextual keyboard determines that the gesture 1804 is associated with an action to post the text to a user's Twitter feed, and, as shown in the screen shot 1810 of FIG. 18B, updates, or initiates an update of, the user's feed 1815 on his/her Twitter page.

Thus, in some implementations, the contextual keyboard uses word macros and gestures to enable a user to post information to various websites and other locations, such as to locations within a user's social network (e.g., Facebook pages, Twitter accounts, Google+ pages, Linkedin profiles, and so on) without requiring the user to launch applications for each different location or website, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

While many embodiments described above employ software stored on the mobile device (either before being given to a subscriber, or during a subscriber call), the scripts and other software noted above may be hard coded into the mobile device (e.g. stored in EEPROM, PROM, etc.). Further, the above functionality may be implemented without scripts or other special modules.

The teachings of the system provided herein can be applied to other systems, not necessarily the system described above. The elements and acts of the various embodiments described above can be combined to provide further embodiments.

All of the above patents and applications and other references, including any that may be listed in accompanying filing papers, are incorporated by reference. Aspects of the system can be modified, if necessary, to employ the systems, functions, and concepts of the various references described above to provide yet further embodiments of the system.

These and other changes can be made to the system in light of the above Detailed Description. While the above description details certain embodiments of the system and describes the best mode contemplated, no matter how detailed the above appears in text, the system can be practiced in many ways. Details of the local-based support system may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

The embodiments of the invention in which an exclusive property or privilege is claimed are defined as follows:

1. A keyboard system for a mobile device, comprising:
    a keyboard component configured to present a virtual keyboard to a user via a touch-screen of the mobile device;
    a gesture reception component configured to receive stroke gesture input via the keyboard component;
    a context component configured to identify contextual information that describes the context in which the stroke gesture input is received;
    an interpretive component configured to determine, based on the received stroke gesture input and the identified contextual information, without additional user input, whether the received stroke gesture input is a command for the keyboard system or is text entry related to inputting a text string,
        wherein the keyboard system is distinct from other applications of the mobile device;
    a text entry component configured to receive stroke gesture input determined as text entry via the virtual keyboard and update a text string based on the received text entry; and
    an action component configured to receive stroke gesture input determined as a command for the keyboard system;
        intercept the received stroke gesture input before it is sent to another active application; and
        perform one or more actions associated with the command received via the virtual keyboard,
            wherein the action is not the function of a key on the keyboard.

2. The keyboard system of claim 1, wherein the action component is configured to perform one or more actions in response to the command and seed text displayed by the touch-screen of the mobile device.

3. The keyboard system of claim 2, wherein the received stroke gesture input is a shape gesture distinct from a path across certain keys on the keyboard.

4. The keyboard system of claim 2, wherein the action component is configured to invoke an application and to provide the detected seed text to the invoked application.

5. The keyboard system of claim 1, wherein the action component is configured to perform one or more actions based on a portion of highlighted text displayed by the touch-screen of the mobile device.

6. The keyboard system of claim 1, wherein the text entry component is configured to receive text entry via the virtual keyboard when a user of the mobile device taps keys of the virtual keyboard or traces a path across keys of the virtual keyboard.

7. A non-transitory computer-readable medium whose contents, when executed by a processor of a computing device, cause the computing device to perform a method to provide a contextual keyboard, comprising:
receiving stroke gesture input via the displayed keyboard,
wherein the displayed keyboard is configured to receive text input; identifying contextual information that describes the context in which the stroke gesture input is received; determining, based on the received stroke gesture input and the identified contextual information, without additional user input, whether the received stroke gesture input comprises a command associated with an action to be performed by the contextual keyboard,
wherein the contextual keyboard is distinct from other applications of the mobile device; and
wherein the action is not the function of a key on the keyboard;
when the received stroke gesture input is determined not to comprise a command for the keyboard application, then:
accepting the received stroke gesture input as input for facilitating the entry of text; and
when the received stroke gesture input is determined to comprise a command for the contextual keyboard, then:
intercepting the received stroke gesture input before it is sent to another active application, such that the stroke gesture input is not accepted as text input;
detecting a displayed seed object upon which an action may be performed; and
performing the associated action based on the determined command and the detected seed object.

8. The non-transitory computer-readable medium of claim 7, wherein the stroke gesture input received via the displayed keyboard is a word macro or a shape gesture distinct from a path across certain keys on the keyboard.

9. The non-transitory computer-readable medium of claim 7, wherein performing the associated action based on the determined command and the detected seed object includes storing information displayed by the computing device in a database of the computing device.

10. The non-transitory computer-readable medium of claim 7, wherein performing the associated action based on the determined command and the detected seed object includes posting information associated with the detected seed object to a webpage.

11. The non-transitory computer-readable medium of claim 7, wherein performing the associated action based on the determined command and the detected seed object includes inserting a link to content based on information associated with the detected seed object.

12. The non-transitory computer-readable medium of claim 7, wherein performing the associated action based on the determined command and the detected seed object includes searching for information associated with the detected seed object.

13. A method performed by a keyboard application of a mobile device, the method comprising:
receiving stroke gesture input via a virtual keyboard of the keyboard application, wherein the virtual keyboard is configured to receive text input;
identifying contextual information that describes the context in which the stroke gesture input is received;
determining, based on the received stroke gesture input and the identified contextual information, without additional user input, whether the received stroke gesture input comprises a command associated with an action to be performed by the keyboard application,
wherein the keyboard application is distinct from other applications of the mobile device; and
wherein the action is not the function of a key on the keyboard;
when the received stroke gesture input is determined not to comprise a command for the keyboard application, then:
accepting the received stroke gesture input as input for facilitating the entry of text; and
when the received stroke gesture input is determined to comprise a command for the keyboard application, then:
intercepting the received stroke gesture input before it is sent to another active application, such that the stroke gesture input is not accepted as text input; and
performing the associated action based on the determined command.

14. The method of claim 13, wherein performing the associated action based on the determined command includes initiating an action to be performed by a separate application running on the mobile device.

15. The method of claim 13, wherein the received input is a text string or a gesture, and wherein determining the received input is associated with an action to be performed by the keyboard application includes determining the text string or gesture is associated with one or more actions to be performed by the keyboard application.

16. The keyboard system of claim 1, wherein the contextual information associated with the received stroke gesture input comprises one or more of text to the left of the text entry point, selected text, or substantially all displayed text.

17. The keyboard system of claim 1, wherein the contextual information associated with the received stroke gesture input comprises one or more of an application in use, content associated with an application in use, previously performed actions, a location of the mobile device, user metadata, or user preferences.

18. The keyboard system of claim 1, wherein the context component is configured to identify seed text associated with the received stroke gesture input, such that the interpretive component determines, based on the identified seed text, whether the received stroke gesture input is a command for the keyboard system.

19. The keyboard system of claim 18, wherein the interpretive component is further configured to determine what action to perform based on the identified seed text.

20. The keyboard system of claim 1, wherein the one or more actions include obtaining a map relating to displayed text.

* * * * *